US008548890B2

(12) United States Patent
Infanger

(10) Patent No.: US 8,548,890 B2
(45) Date of Patent: Oct. 1, 2013

(54) EXPECTED UTILITY MAXIMIZATION IN LARGE-SCALE PORTFOLIO OPTIMIZATION

(76) Inventor: Gerd Infanger, Palo Alto, CA (US)

(*) Notice: Subject to any disclaimer, the term of this patent is extended or adjusted under 35 U.S.C. 154(b) by 66 days.

(21) Appl. No.: 12/927,175

(22) Filed: Nov. 9, 2010

(65) Prior Publication Data

US 2012/0116988 A1 May 10, 2012

(51) Int. Cl.
*G06Q 40/00* (2012.01)
(52) U.S. Cl.
USPC ........... 705/36 R; 705/4; 705/7.28; 705/7.39; 705/35; 706/52
(58) Field of Classification Search
None
See application file for complete search history.

(56) References Cited

U.S. PATENT DOCUMENTS

| | | | | | |
|---|---|---|---|---|---|
| 5,884,287 | A * | 3/1999 | Edesess | ...................... | 705/36 R |
| 6,021,397 | A * | 2/2000 | Jones et al. | .................. | 705/36 R |
| 6,292,787 | B1 * | 9/2001 | Scott et al. | ................... | 705/36 R |
| 6,493,682 | B1 * | 12/2002 | Horrigan et al. | ........... | 705/36 R |
| 7,016,870 | B1 * | 3/2006 | Jones et al. | ..................... | 705/35 |
| 7,050,998 | B1 * | 5/2006 | Kale et al. | .................... | 705/36 R |
| 7,089,190 | B2 * | 8/2006 | Tsui | ................................ | 705/63 |
| 7,120,601 | B2 * | 10/2006 | Chen et al. | ................... | 705/36 R |
| 7,249,081 | B2 * | 7/2007 | Shearer et al. | .............. | 705/36 R |
| 7,257,566 | B2 * | 8/2007 | Danielson et al. | ............. | 706/52 |
| 7,412,414 | B2 * | 8/2008 | Michaud et al. | ........... | 705/36 R |
| 7,502,756 | B2 * | 3/2009 | Pillai | ........................... | 705/36 R |
| 7,624,060 | B2 * | 11/2009 | Michaud et al. | ........... | 705/36 R |
| 7,716,125 | B2 * | 5/2010 | Shavit et al. | .................... | 705/38 |
| 7,809,626 | B2 * | 10/2010 | Gorbatovsky | .............. | 705/36 R |
| 7,873,442 | B2 * | 1/2011 | Tsui | .............................. | 700/291 |
| 7,877,308 | B1 * | 1/2011 | Padgette et al. | ................. | 705/35 |
| 7,890,409 | B2 * | 2/2011 | Rachev et al. | .............. | 705/36 R |
| 7,895,116 | B2 * | 2/2011 | Chatter et al. | .................. | 705/37 |
| 7,945,509 | B1 * | 5/2011 | Chatter et al. | .................. | 705/37 |
| 8,219,483 | B2 * | 7/2012 | Chatter et al. | .................. | 705/37 |
| 8,301,544 | B2 * | 10/2012 | Chatter et al. | .................. | 705/37 |
| 2002/0123953 | A1 * | 9/2002 | Goldfarb et al. | ................ | 705/36 |
| 2003/0078867 | A1 * | 4/2003 | Scott et al. | ...................... | 705/36 |
| 2003/0126054 | A1 * | 7/2003 | Purcell, Jr. | ...................... | 705/36 |
| 2003/0182224 | A1 * | 9/2003 | Horrigan et al. | ................ | 705/37 |
| 2003/0195831 | A1 * | 10/2003 | Feldman | ........................ | 705/36 |
| 2003/0233301 | A1 * | 12/2003 | Chen et al. | ...................... | 705/36 |
| 2004/0167843 | A1 * | 8/2004 | French | ............................ | 705/36 |
| 2004/0181479 | A1 * | 9/2004 | Zosin et al. | ..................... | 705/36 |
| 2005/0071186 | A1 * | 3/2005 | Manzo | ............................... | 705/1 |
| 2006/0106656 | A1 * | 5/2006 | Ouimet | ............................ | 705/7 |

(Continued)

FOREIGN PATENT DOCUMENTS

WO WO 99/22323 * 5/1999

OTHER PUBLICATIONS

S. Rachev et al., "The Problem of Optimal Asset Allocation With Stable Distributed Returns," A Dekker Series of Lecture Notes in Pure and Applied Mathematics p. 295-361.*

*Primary Examiner* — Robert Niquette
(74) *Attorney, Agent, or Firm* — William C. Milks, III

(57) ABSTRACT

A system and method efficiently solve the expected utility maximization problem in large-scale financial asset portfolio optimization. The system and method solve the expected utility maximization problem employing a factor representation of asset returns. Additionally, the system and method calibrate the optimization model to a benchmark to obtain unconditional mean returns and enable active management based on conditional expected return predictions. The system and method also enable options to be considered as part of the portfolio.

14 Claims, 3 Drawing Sheets

(56) References Cited

U.S. PATENT DOCUMENTS

| | | | |
|---|---|---|---|
| 2006/0190371 A1* | 8/2006 | Almgren et al. | 705/35 |
| 2006/0271466 A1* | 11/2006 | Gorbatovsky | 705/35 |
| 2008/0010181 A1* | 1/2008 | Infanger | 705/36 R |
| 2008/0183638 A1* | 7/2008 | Chigirinskiy et al. | 705/36 R |
| 2009/0030829 A1* | 1/2009 | Chatter et al. | 705/37 |
| 2010/0017338 A1* | 1/2010 | Gorbatovsky | 705/36 R |
| 2010/0332411 A1* | 12/2010 | Rachev et al. | 705/36 R |
| 2011/0087622 A1* | 4/2011 | Padgette et al. | 705/36 R |
| 2011/0112923 A1* | 5/2011 | Chatter et al. | 705/26.3 |
| 2011/0112924 A1* | 5/2011 | Chatter et al. | 705/26.3 |
| 2011/0231228 A1* | 9/2011 | Chatter et al. | 705/7.35 |
| 2011/0295767 A1* | 12/2011 | Raynes et al. | 705/36 R |
| 2012/0069131 A1* | 3/2012 | Abelow | 348/14.01 |

* cited by examiner

EXPECTED UTILITY MAXIMIZATION IN LARGE-SCALE PORTFOLIO OPTIMIZATION

BACKGROUND OF THE INVENTION

1. Field of the Invention

The present invention relates generally to a system and method for management of a portfolio of financial assets and, more particularly, to large-scale portfolio optimization. Specifically, various embodiments in accordance with the present invention provide a system and method for expected utility maximization in large-scale portfolio optimization.

2. Description of the Prior Art

Portfolio problems are routinely formulated and solved as mean-variance portfolio optimization problems, based on H. Markowitz, Portfolio selection, *Journal of Finance*, 7(1):77-91, 1952, where expected return and risk of a portfolio are traded off and where portfolio risk is represented as portfolio variance. For example. let R be the random n-vector of asset returns. The mean-variance portfolio optimization problem may then be stated as $$\max \mu^T x - \frac{\gamma}{2} x^T M x$$
$$Ax = b, l \le x \le h$$

where $\mu=ER$ is the n-vector of expected asset returns, $M=[M_{ij}]$ is the n×n covariance matrix of asset returns ($M_{ij}=\text{cov}(R_i, R_j)$), $\gamma$ is the risk aversion parameter, $Ax=b$ are linear constraints and l, and h are lower and upper bounds on asset holdings.

Mean-variance optimization is particularly appropriate when asset returns are distributed according to a multivariate normal distribution, i.e., $R \approx N(\mu, M)$, because in this case the distribution is fully determined by $\mu$ and M only, as all higher moments are zero.

A related concept is expected utility maximization. For example. let u be a monotone increasing and concave utility function of wealth. The expected utility maximization problem may be expressed as $$\max E u (1+R^T x)$$
$$Ax=b, l \le x \le h$$

where, given an initial wealth normalized to 1, an end-of-period wealth is given by the random variable $W=1+R^T x$. The particular functional form of the utility function u in the above expression represents an investor preference. Utility functions commonly used are from the hyperbolic absolute risk aversion (HARA) class of utility functions, but also utility functions based on lower partial moments that explicitly penalize outcomes below a certain target wealth are appropriate choices. Often in finance the power function is used, i.e., $$u(W) = \frac{W^{1-\gamma} - 1}{1 - \gamma},$$

where here $\gamma$ represents the constant (with respect to wealth) relative risk aversion parameter describing the investor preference towards risk.

Expected utility maximization is a broader concept than mean-variance optimization. Expected utility maximization facilitates the appropriate representation of all higher moments (e.g., skewness, kurtosis, etc.) of the asset return distribution in the portfolio optimization framework. If $$u(W) = EW - \frac{\gamma}{2} \text{var}(W),$$

the mean-variance and the expected utility maximization models are identical. However, any other utility function will yield different results, when asset returns are not multivariate normally distributed. Otherwise, if asset return distributions are multivariate normally distributed, any monotone increasing and concave utility function will yield a mean-variance efficient portfolio.

One expects different results for mean-variance and expected utility maximization for asset returns that are not multivariate normally distributed. The differences in the portfolios may be small as Y. Kroll, H. Levy, and H. Markowitz, Mean-variance versus direct utility maximization, *Journal of Finance*, 39(1):47-61, 1984, argued.

In practical implementations of mean-variance portfolio optimization, the mean vector pt and the covariance matrix M need to be estimated. Historical observations $R^\omega$, $\omega \in \Omega$ of R may be used to estimate the quantities. However, for a large number of assets, i.e., $n > T = |\Omega|$, using sample averages directly to estimate the mean vector and the covariance matrix do not yield the desired results, because the sample errors tend to be large and also the resulting covariance matrix is rank deficient (positive semidefinite rather than positive definite).

In order to overcome this problem, factor models have been introduced that linearly relate the n-vector of asset returns R to a smaller number k of factors V stated as $$R=F^T V + \epsilon$$

where F is the k×n matrix of factor loadings and $\epsilon$, the n-vector of the difference $R-F^T V$, is assumed to be an independently (between its components, respectively, and with respect to V) distributed vector of error terms.

In practice, a factor model is estimated employing pairs of historical observations $R^\omega$, $V^\omega$ and regression analysis to obtain an estimate of F. The estimation results in an asset return process of the form $$R=F^T V^\omega + \epsilon, \omega \in \Omega.$$

Using this asset return process, the covariance matrix can now be obtained as $$M=F^T M_V F + D,$$

where $M_V=[k \times k]$ is the covariance matrix of the factors (or factor returns), $D=\text{diag}(\sigma_i^2)$ is the diagonal matrix of the idiosyncratic risk, and $\sigma_i^2$ is the variance of the i-th independent error term $\epsilon_i$. The matrix $M_V$ is estimated employing historical observations, and because D is diagonal, the resulting covariance matrix M is of full rank ($\text{rank}(M)=n$). The number of parameters to be estimated is much smaller (nk for the factor loadings+$k^2$ for the factor covariances+k for the means) than without imposing the linear factor model (($n(n+1)/2$ for the covariances+n for the means), especially when the number of factors k is kept reasonably small.

The mean-variance portfolio optimization problem based on a factor model representation of asset returns, $$\max \mu^T x - \frac{\gamma}{2} x^T (F^T M_V F + D) x$$
$$Ax = b, l \le x \le h$$

employing estimates based on historical observations $\omega \in \Omega$ for F, $M_V$, and D is currently the state-of-the art in large-scale portfolio optimization. See R. C. Grinold and R. Kahn, *Active Portfolio Management*, McGraw-Hill, New York, N.Y., 2000. Commercially available software applications for equity portfolio optimization are typically based on estimated factor models and use mean-variance optimization.

Consequently, known software applications for equity portfolio optimization are limited. It is desirable to also use the factor model for expected utility optimization. The corresponding portfolio optimization problem can be stated as $$\max E\, u\, (1+(F^T V^\omega + \epsilon)^T x)$$
$$Ax=b, l \le x \le h$$

where the objective function includes the expectation over a discrete random vector ($F^T V^\omega$) and over the continuous random vector $\epsilon$.

Expected utility maximization problems have been formulated using a sample average approximation based on historical return observations in R. C. Grinold, Mean-variance and scenario-based approaches to portfolio selection, *Journal of Portfolio Management*, 25(2):10-22, 1999, as $$\max \frac{1}{|\Omega|} \sum_{\omega \in \Omega} u(1 + R_c^{\omega T} x)$$
$$Ax = b, l \le x \le h$$

where the current (subscript c) return observations based on forward looking estimates of mean return and volatility are $$R_{ci}^{\omega T} = \mu_{ci} + \sigma_{ci} z_i^\omega$$

where the z-scores $z_i^\omega$ are computed from the return observations $R_i^\omega$ by subtracting the historical mean and dividing by the historical standard deviation such that they each have a mean value of zero and a standard deviation of one, and $\mu_c$ and $\sigma_c$ are forward looking estimates of asset mean return and volatility.

The sample average model is a good approximation as long as $|\Omega| \gg n$, because only then the problem is not rank deficient and statistically viable. However, for large-scale utility maximization problems, where $n > |\omega|$, the sample average approximation based on historical return observations is not a good approximation.

Approximations for a related version of the expected utility maximization problem based on a factor model for asset returns have been described by M. W. Brandt, P. Santa Clara, and R. Valkanov, Parametric portfolio policies: Exploiting characteristics in the cross section of equity returns, *Review of Financial Studies*, 22(9): 3411-3447, 2004, and by S. De Boer, Factor tilting for expected utility maximization, *Journal of Asset Management*, 11:31-42, 2010. Brandt et al. (2004) constructed an expected utility maximization model with factor exposures as the decision variables, where the portfolio weights are subsequently derived from the estimated factor loadings and the optimal factor exposures. This model assumes constant factor exposures over time. DeBoer (2010) first calculates the expected utility optimal portfolio weights for a given factor exposure parametrically as a function of possible factor exposures, and then solves the expected utility optimization problem in the factor space. Disadvantageously, both techniques are approximations and appear unable to handle general constraints.

Conceptually, a direct approach might be to employ sampling from the factor model representation of asset returns. Accordingly, let $R^\nu \in S$ be a sample of returns of size $|S|$, sampled independently from the factor model of asset returns $R = F^T V^\omega + \epsilon$. The corresponding sample average approximation of the expected utility maximization problem then is $$\max \frac{1}{|S|} \sum_{\nu \in S} u(1 + R^{\nu T} x)$$
$$Ax = b, l \le x \le h$$

In order to represent the distribution of asset returns accurately and to obtain a problem of full rank, the sample size $|S|$ needs to be very large, i.e., $|S| \gg n$. However, this may be computationally prohibitive for a large number of assets.

It would be desirable to overcome the shortcomings of previous techniques that address the expected utility maximization problem. It is to this end that the present invention is directed. The system and method in accordance with the various embodiments of the present invention proceed differently to solve the expected utility maximization problem by exploiting the structure of the problem. The various embodiments of the present invention thus provide many advantages over conventional large-scale financial portfolio optimization techniques. Accordingly, the various embodiments of the present invention provide a system and method that maximize expected utility optimization in connection with management of a large-scale financial asset portfolio. The foregoing and other objects, features, and advantages of the present invention will become more readily apparent from the following detailed description of various embodiments, which precedes with reference to the accompanying drawing.

SUMMARY OF THE INVENTION

Various embodiments in accordance with the present invention provide a system and method for efficiently solving the expected utility maximization problem in large-scale financial asset portfolio optimization. Preferred embodiments of the system and method in accordance with the present invention solve the expected utility maximization problem employing a factor representation of asset returns. Various embodiments in accordance with the present invention calibrate the optimization model to a benchmark to obtain unconditional mean returns and enable active management based on conditional expected return predictions. Various additional embodiments of the system and method in accordance with the present invention consider options as part of the portfolio.

BRIEF DESCRIPTION OF THE DRAWING

The various embodiments of the present invention will be described in conjunction with the accompanying figures of the drawing to facilitate an understanding of the present invention. In the figures, like reference numerals refer to like elements. In the drawing.

DETAILED DESCRIPTION OF THE PREFERRED EMBODIMENTS

The present invention is particularly applicable to a computer implemented software based financial asset portfolio management system for providing expected utility maximization in large-scale portfolio optimization, and it is in this context that the various embodiments of the present invention will be described. It will be appreciated, however, that the system and method for providing expected utility maximization optimization in large-scale portfolio management in accordance with the present invention have greater utility, since they may be implemented in hardware or may incorporate other modules or functionality not described herein.

Figure 1:
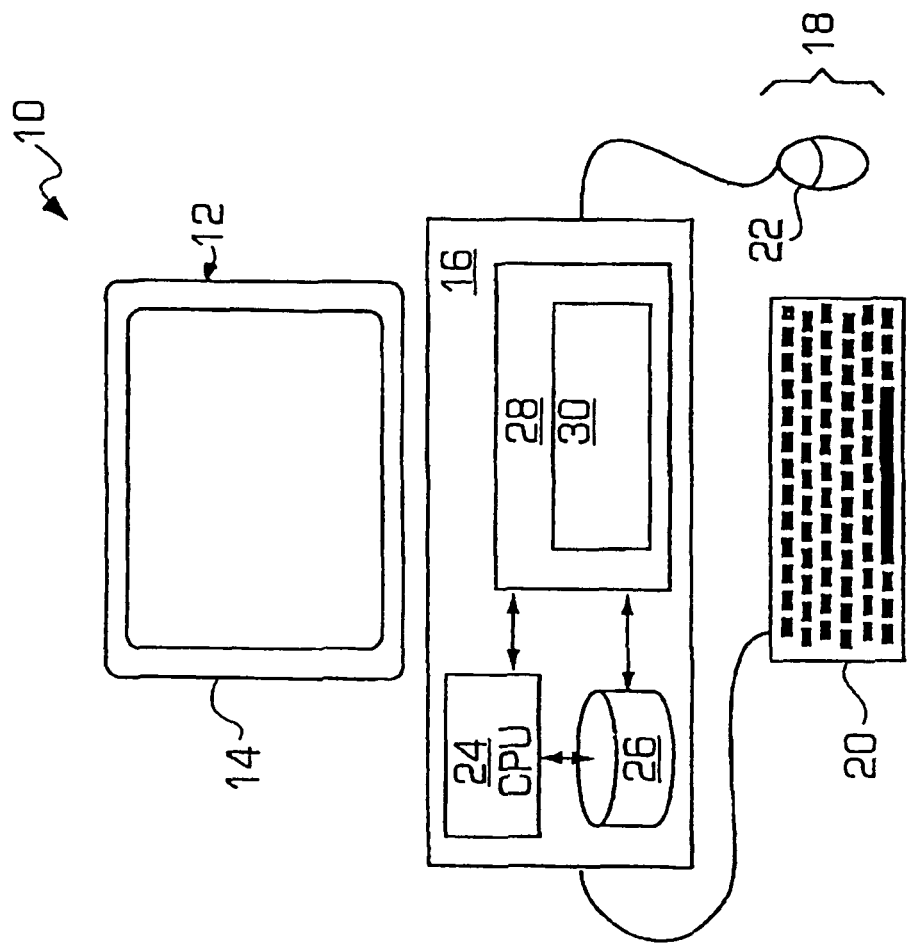
FIG. 1 is a block diagram of an example of a system in accordance with a preferred embodiment of the present invention implemented on a personal computer.

FIG. 1 is a block diagram illustrating an example of an expected utility maximization optimization system 10 for large-scale portfolio management in accordance with one embodiment of the present invention implemented on a personal computer 12. In particular, the personal computer 12 may include a display unit 14, which may be a cathode ray tube (CRT), a liquid crystal display, or the like; a processing unit 16; and one or more input/output devices 18 that permit a user to interact with the software application being executed by the personal computer. In the illustrated example, the input/output devices 18 may include a keyboard 20 and a mouse 22, but may also include other peripheral devices, such as printers, scanners, and the like. The processing unit 16 may further include a central processing unit (CPU) 24 (e.g., a Pentium 4 3.4 MHz and 2 GB of RAM), a persistent storage device 26, such as a hard disk, a tape drive, an optical disk system, a removable disk system, or the like, and a memory 28. The CPU 24 may control the persistent storage device 26 and memory 28. Typically, a software application may be permanently stored in the persistent storage device 26 and then may be loaded into the memory 28 when the software application is to be executed by the CPU 24. In the example shown, the memory 28 may contain an expected utility maximization optimization tool 30 for large-scale portfolio management. The expected utility maximization optimization tool 30 may be implemented as one or more software modules that are executed by the CPU 24. In accordance with various contemplated embodiments of the present invention, the expected utility maximization optimization system 10 may also be implemented using hardware and may be implemented on different types of computer systems, such as client/server systems, Web servers, mainframe computers, workstations, and the like.

Figure 2:
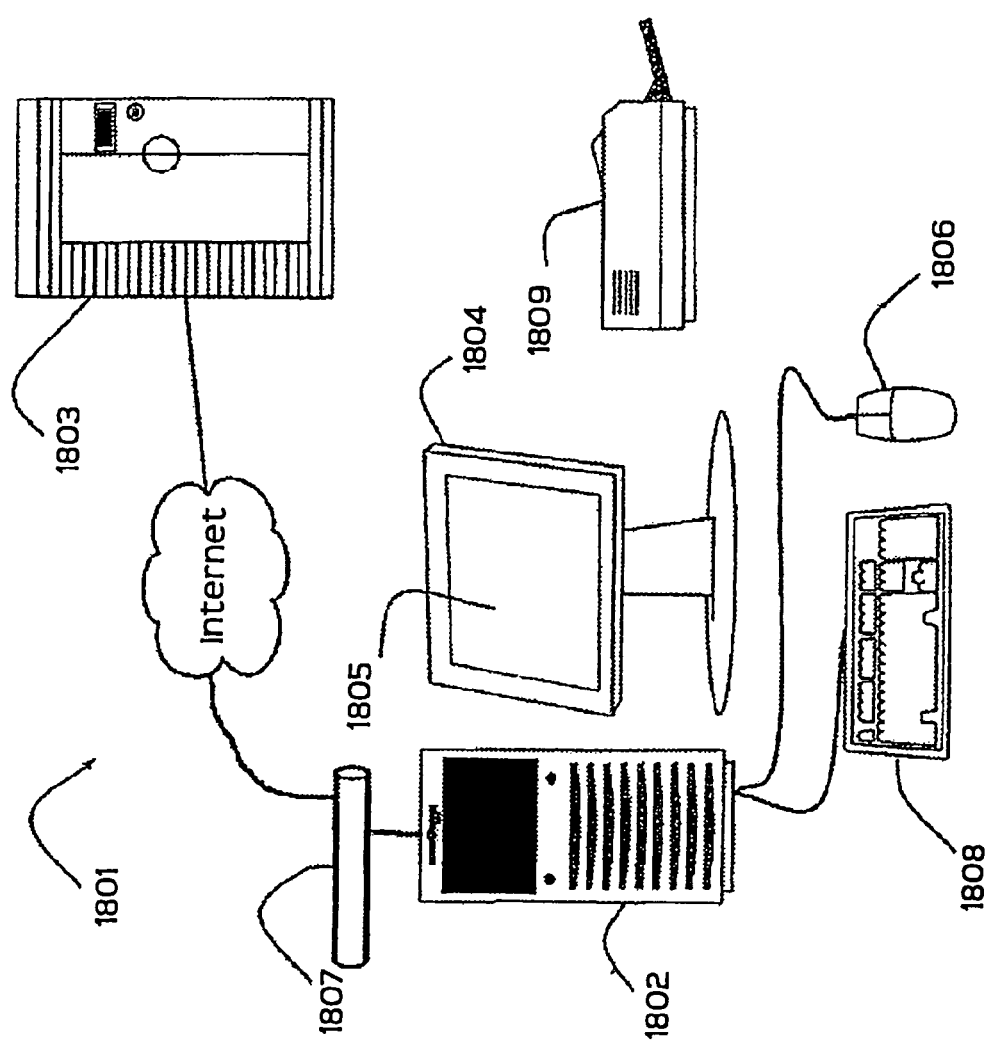
FIG. 2 is a block diagram of an example of a system in accordance with an alternative embodiment of the present invention implemented on a personal computer coupled to a web or Internet server.

Thus, in accordance with another embodiment of the present invention, the expected utility maximization optimization system 10 is implemented via a hosted Web server. A system using a hosted Web server, generally indicated by the numeral 1801, is shown in FIG. 2. The system 1801 preferably comprises a Web-based application accessed by a personal computer 1802, as shown in FIG. 2. For example, the personal computer 1802 may be any personal computer having at least two gigabytes of random access memory (RAM), using a Web browser, preferably MICROSOFT Internet Explorer 6.0 browser or greater. In this example, the system 1801 is a 128-bit SSL encrypted secure application running on a MICROSOFT Windows Server 2003 operating system or Windows Server 2000 operating system or later operating system available from Microsoft Corporation located in Redmond, Wash. The personal computer 1802 also comprises a hard disk drive preferably having at least 40 gigabytes of free storage space available. The personal computer 1802 is coupled to a network 1807. For example, the network 1807 may be implemented using an Internet connection. In one implementation of the system 1801, the personal computer 1802 can be ported to the Internet or Web, and hosted by a server 1803. The network 1807 may be implemented using a broadband data connection, such as, for example, a DSL or greater connection, and is preferably a T1 or faster connection. The graphical user interface of the system 1801 is preferably displayed on a monitor 1804 connected to the personal computer 1802. The monitor 1804 comprises a screen 1805 for displaying the graphical user interface provided by the system 1801. The monitor 1804 may be a 15 color monitor and is preferably a 1024×768, 24-bit (16 million colors) VGA monitor or better. The personal computer 1802 further comprises a 256 or more color graphics video card installed in the personal computer. As shown in FIG. 2, a mouse 1806 is provided for mouse-driven navigation between screens or windows comprising the graphical user interface of the system 1801. The personal computer 1802 is also preferably connected to a keyboard 1808. The mouse 1806 and keyboard 1808 enable a user utilizing the system 1801 to perform expected utility maximization optimization. Preferably, the user can print the results using a printer 1809. The system 1801 is implemented as a Web-based application, and data may be shared with additional software (e.g., a word processor, spreadsheet, or any other business application). Persons skilled in the art will appreciate that the systems and techniques described herein are applicable to a wide array of business and personal applications.

Figure 3:
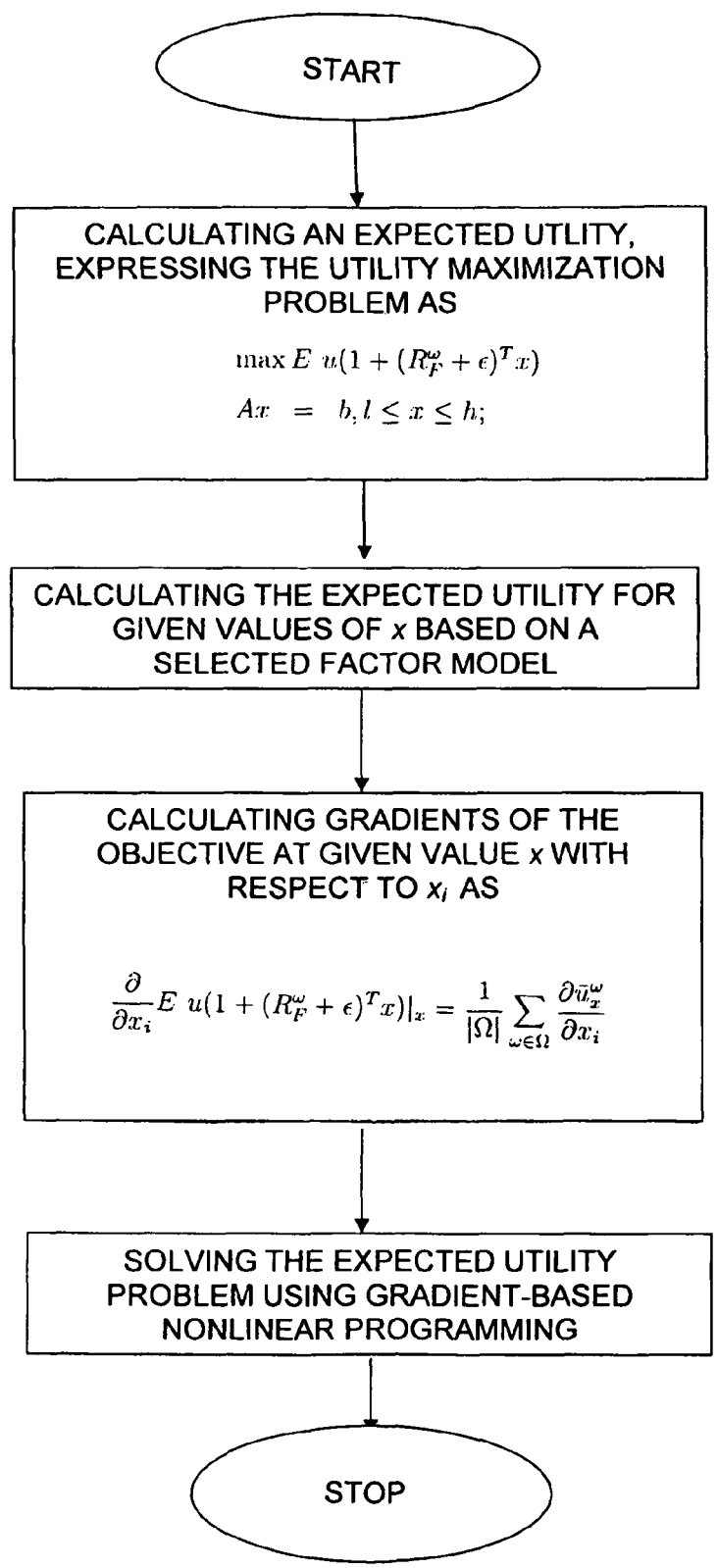
FIG. 3 is a flowchart illustrating a method in accordance with a preferred example of the present invention for providing expected utility maximization in large-scale financial asset portfolio optimization.

In accordance with one embodiment of the method of the present invention for expected utility maximization optimization shown in FIG. 3, the expected utility of the sum of a discrete and a continuous random variable, distributed independently, is calculated. Accordingly, let $$E\,u(a+b)$$

where a: $a^\omega$, $q^\omega = q(\omega)$, $\omega \in \Omega$ b: $v$, $p(v)$, $v \in \mathcal{R}$ a,b distributed independently $$Eu(a+b) = \sum_{\omega \in \Omega} q^\omega \int_{-\infty}^{\infty} u(a^\omega + v)p(v)dv = \sum_{\omega \in \Omega} q^\omega \bar{u}^\omega,$$

where $$\bar{u}^\omega = \int_{-\infty}^{\infty} u(a^\omega + v)p(v)dv.$$

In the case of a normally distributed random variable, $b = N(\mu, \sigma^2)$, $b = \mu + \sigma N(0,1)$, $$\bar{u}^\omega = \frac{1}{\sqrt{2\pi}} \int_{-\infty}^{\infty} u(a^\omega + \mu + \sigma v) e^{\frac{-v^2}{2}} dv.$$

In practice, the infinite bounds of the integration may be replaced by finite bounds $\tau$, where, for example, with sufficiently numerical accuracy, $\tau = 5$, and integrating the normal distribution between minus five and plus five standard deviations, such that $$\bar{u}^\omega = \frac{1}{\sqrt{2\pi}} \int_{-\tau}^{+\tau} u(a^\omega + \mu + \sigma v) e^{\frac{-v^2}{2}} dv.$$

The expected utility and factor models in large-scale financial asset portfolio optimization can now be derived as follows. Let R be an n-vector of asset returns, defined by the following process:

$$R = F^T V^\omega + \epsilon$$

where $F = [k \times n]$ is a matrix of factor loadings, $V^\omega$ is the k-vector of factor returns for each scenario observation $\omega \in \Omega$, and $\epsilon$ is the n-vector of asset specific idiosyncratic risk. It is assumed that $\epsilon$ is multivariate normal, that is, $$\epsilon = N(0, \Sigma)$$

where $$\Sigma = \text{diag}(\sigma_i^2)$$

and $\epsilon$ is also assumed independently distributed with regard to $V^\omega$, $\omega \in \Omega$.

The above assumptions are typical for all factor models, including the fundamental, statistical, or macro-economic types. The factor model estimation for the different types of factor models is as follows.

Factor models for asset returns are typically one of three forms: the fundamental factor model, the macro-economic factor model, or the statistical factor model. See, e.g., G. Connor, The three types of factor models: A comparison of their explanatory power, *Financial Analysts Journal*, 51(3): 42-46, 2004. In each of these factor models, asset returns are assumed to follow the process $$R = F^T V + \epsilon$$

where R is the n-vector of asset returns, $F = [k \times n]$ is the matrix of factor loadings, V is the k-vector of factor outcomes, and $\epsilon$ is the n-vector of asset specific idiosyncratic risk. The vector $\epsilon$ is typically assumed to be distributed according to a multivariate normal distribution $$\epsilon = N(0, \Sigma)$$

where $$\Sigma = \text{diag}(\sigma_i^2),$$

and $\epsilon$ is also assumed independently distributed with regard to the factor vector V. The distribution of V is typically unknown. But estimating the parameters of the factor model based on a finite number of observations $\omega$, V is typically assumed to follow the empirical distribution $V = V^\omega$, $\omega \in \Omega$, where $\Omega$ is the set of discrete observations employed for estimating the parameters of the factor model. Thus, the process of asset returns may be expressed as $$R = F^T V^\omega + \epsilon.$$

In accordance with the fundamental factor model pairs $R^\omega$, $F^\omega$ are observed, where $F^\omega$ is the value of company specific data at the beginning of an observation period and $R^\omega$ is the return observed during the observation period. For the current period, $F = F^c$ is observed, and R is unknown.

Using observations $\omega \in \Omega$, the fundamental factor model is estimated as $$\min \sum_{\omega \in \Omega} \delta^{\omega T} \delta^\omega,$$

$$s/t \ \delta^\omega = R^\omega - F^{\omega T} V^\omega$$

by actually performing $|\Omega|$ separate linear regressions $$\min \delta^{\omega T} \delta_\omega, \ s/t \delta^\omega = R^\omega - F^{\omega T} V^\omega)$$

for each $\omega \in \Omega$, each minimizing the sum of the square of deviations, where $\delta^\omega$ is the n-vector of residuals. As a result, $$V^\omega = (F^{\omega T} F^\omega)^{-1} F^\omega R^\omega$$

empirical observations of the factor returns for $\omega \in \Omega$ are obtained, conditioned on the observations $F^\omega$.

For predicting the returns $R = R^c$ at the current period, conditioned on the current value of $F = F^c$, the fundamental factor model is $$R = F^T V^\omega + \epsilon, \text{ for } F = F^c.$$

For the current period c, an estimator for $\sigma_i^{c2}$ is $$\hat{\sigma}_i^{c2} = \frac{1}{|\Omega| - 1} \sum_{\omega \in \Omega} (\delta_i^\omega)^2.$$

In order to capture any time dependency of the idiosyncratic risk, the following model for idiosyncratic returns may be imposed:

$$\epsilon = \sigma^\omega \eta$$

where $\sigma^\omega$ is the common component of the cross-sectional variation of idiosyncratic risk, $\eta$ is the n-vector of individual asset variations over the common component cross-sectional variations, and $\epsilon$ are the unexplained (by the fundamental factor model) returns.

An estimator for the common component of the cross-sectional idiosyncratic variance in period $\omega$, $\sigma^{\omega 2}$ is $$\hat{\sigma}^{\omega 2} = \frac{1}{n-k} (\delta^\omega)^T (\delta^\omega).$$

and an estimator for the common component of the cross-sectional idiosyncratic variance for the current period c is $$\hat{\sigma}^{c2} = \frac{1}{|\Omega|} \sum_{\omega \in \Omega} \hat{\sigma}^{\omega 2}.$$

The estimator for the idiosyncratic variance for the current period c then is $$\hat{\sigma}_i^{c2} = \hat{\sigma}^{c2} \frac{1}{|\Omega|-1} \sum_{\omega \in \Omega} \left(\frac{\delta_i^\omega}{\hat{\sigma}^\omega}\right)^2.$$

By treating the elements of the set $\Omega$ as a time series, e.g., $\Omega=\{1, 2, \ldots, T\}$ and $c=T+1$, $\sigma^\omega$ may be modeled as a lag-one autoregressive process and estimate $\sigma^c$, for the current period c, as $$\hat{\sigma}^c = a + b\hat{\sigma}^{c-1}$$

where the parameters a and b are obtained as the result of the linear regression $$\min \sum_{\omega=2}^{|\Omega|} (v^\omega)^2,$$
$$s/t \ v^\omega = \hat{\sigma}^\omega - (a + b\hat{\sigma}^{\omega-1}).$$

Using the autoregressive model, the estimator for the idiosyncratic variance $\sigma_i^{c2}$ becomes $$\hat{\sigma}_i^{c2} = \hat{\sigma}^{c2} \frac{1}{|\Omega|-1} \sum_{\omega \in \Omega} \left(\frac{\delta_i^\omega}{\hat{\sigma}^\omega}\right)^2.$$

In a related aspect, the idiosyncratic variance of asset i may be assumed to be proportional to some quantities $$\frac{1}{w_i}.$$

For example, $w_i$ may be the square root of the capitalization of company i. Defining the weight matrix $W = \text{diag } w_i$, the fundamental factor model may be stated as $$\min \sum_{\omega \in \Omega} \left(W^{\frac{1}{2}} \delta^\omega\right)^T \left(W^{\frac{1}{2}} \delta^\omega\right),$$
$$s\backslash t \ \delta^\omega = R^\omega F^{\omega T} V^\omega$$

by actually performing $|\Omega|$ weighted linear regressions $$\min \left(W^{\frac{1}{2}} \delta^\omega\right)^T \left(W^{\frac{1}{2}} \delta^\omega\right),$$
$$s/t \ \delta^\omega = R^\omega - F^{\omega T} V^\omega,$$

for each $\omega \in \Omega$, each minimizing the weighted sum of the square of deviations. The result for the weighted regression for period $\omega$ is obtained as $$V^\omega = (F^{\omega T} W^{-1} F^\omega)^{-1} F^\omega W^{-1} R^\omega.$$

In accordance with the assumptions, the covariance matrix of the idiosyncratic returns, $$\sum^\omega, \text{ is } \sum^\omega = \sigma^{\omega 2} W^{-1},$$

and an estimator for $\sigma^{\omega 2}$ is $$\hat{\sigma}^{\omega 2} = \frac{1}{n-k} \left(W^{\frac{1}{2}} \delta^\omega\right)^T \left(W^{\frac{1}{2}} \delta^\omega\right).$$

In predicting for the current period c, a predictor for $\sigma^{c2}$ is $$\hat{\sigma}^{c2} = \frac{1}{|\Omega|} \sum_{\omega \in \Omega} \hat{\sigma}^{\omega 2}.$$

Again, by treating the elements of the set $\Omega$ as a time series, e.g., $\Omega=\{1, 2, \ldots, T\}$ and $c=T+1$, $\sigma^\omega$ may be modeled as a lag-one autoregressive process and estimate $\sigma^c$, for the current period c, as $$\hat{\sigma}^c a + b\hat{\sigma}^{c-1} + \hat{\sigma}_v$$

where the parameters a and b and the variance $\hat{\sigma}_v^2$ are obtained as the result of the corresponding linear regression described above.

In accordance with the macro-economic factor model, pairs $R^\omega$, $V^\omega$ are observed, where $V^\omega$ are the changes of common macro-economic factors during an observation period, and $R^\omega$ is the return observed during the observation period. Using observations $\omega \in \Omega$, the fundamental factor model is estimated as $$\min \sum_{i=1}^n \sum_{\omega \in \Omega} (\delta_i^\omega)^2$$
$$s/t \ \delta^\omega = R^\omega - F^{\omega T} V^\omega$$

by performing n linear regressions minimizing the sum of the square of deviations. As a result, F, the matrix of factor loadings, is obtained, which is assumed constant. For predicting returns, the observations of changes of macro-economic factors $V^\omega$ may be used directly, or other shocks (changes) to the macro-economic variables may be used, to create appropriate scenarios to obtain $$R = F^T V^\omega + \epsilon$$

Assuming that the idiosyncratic variance is constant, an estimator for $\sigma_i^2$ is $$\hat{\sigma}_i^2 = \frac{1}{|\Omega|-1} \sum_{\omega \in \Omega} (\delta_i^\omega)^2.$$

Other models of idiosyncratic risk, described above, may alternatively be employed.

In accordance with the statistical factor model, based on observations of $R^\omega$, a maximum likelihood fit is computed for F and $V^\omega$ simultaneously by performing either a singular value decomposition on the $|\Omega| \times n$ matrix $R^\omega$ or an eigenvalue decomposition on the (sample) covariance matrix of observations $R^\omega$. The singular value decomposition (and similarly, the eigenvalue decomposition) yields an identity $$R^\omega = F^T V^\omega$$

when considering all $|\Omega|$ singular values (or eigenvalues). By setting the n−k smallest (least significant) singular values (eigenvalues) to zero, the corresponding n−k least significant factors are dropped, and, consequently, $$R^\omega = F^T V^\omega + \delta^\omega$$

Based on the typical statistical assumption for the residuals $\epsilon$, the result is $$R = F^T V^\omega + \epsilon.$$

Assuming further that the idiosyncratic variance is constant, an estimator for $\sigma_i^2$ is $$\hat{\sigma}_i^2 = \frac{1}{|\Omega|-1} \sum_{\omega \in \Omega} (\delta_i^\omega)^2.$$

Other models of idiosyncratic risk, described above, may alternatively be employed. It is noted that for statistical factor models the resulting factors $V_i^\omega$ are uncorrelated by design, and thus the covariance matrix of the factors is diagonal.

Finally, hybrid factor models of a fundamental and a statistical factor model may be employed, where either a statistical factor analysis is performed on the residuals of the fundamental factor model, or the fundamental factor model is estimated using the residual returns of a statistical factor model. Similarly, a hybrid model may be devised based on a macro-economic and a statistical factor model, and potentially all three, namely, a macro-economic, a fundamental, and a statistical factor model could be chained together as a three-fold hybrid model. Typically in hybrid models, only very few statistical factors are effectively used in order to capture factor return contributions, which may not be measured by any of the fundamental or macro-economic factors. A hybrid factor model then has the structure $$R = F_F^T V_F^\omega + F_M^T V_M^\omega + F_S^T V_S^\omega + \epsilon$$

where the subscripts F, M, and S refer to fundamental, macro-economic and statistical factor models, respectively. As described above, an estimator for $\sigma_i$ is obtained from the residual observations $\delta^\omega$. Other models of idiosyncratic risk, described above, may alternatively be employed.

Now, an example portfolio optimization problem may be expressed as $$\max E\, u\, (1+R^T x)$$

$$Ax=b, l \leq x \leq h.$$

The objective maximizes the expected utility of end period wealth, where the utility function u(W) may be any monotonically increasing and concave function. In particular, the power function selected may be $$u(W) = \frac{W^{1-\gamma}-1}{1-\gamma}$$

where $W=1+R^T x$, and the components $R_i$ are represented as rate of return$_i$, e.g., a return of 5% is represented as 0.05.

Considered in more detail, for the power utility function $$u(W) = \frac{W^{1-\gamma}-1}{1-\gamma}, \gamma > 0, \gamma \neq 1,$$

the first and second derivatives are $$u'(W)=W^{-\gamma},\ u''(W)=-\gamma W^{-\gamma-1},$$

respectively, and the Arrow-Pratt relative risk aversion (RRA) is $$RRA = -W \frac{u''(W)}{u'(W)} = \gamma$$

where $\gamma$ is known as the relative risk aversion coefficient. It is noted that for the power utility function, the relative risk aversion RRA is constant and independent of W.

For $\gamma=1$ the power utility function transforms into the logarithmic utility function $$u(W) = \log(W)$$

with $$u'(W) = \frac{1}{W},\ u''(W) = -W^{-2},$$

respectively, and RRA=1.

The linear constraints Ax=b in the expression for the portfolio optimization problem above include the portfolio constraint $e^T x=1$, in the long-only case, or an appropriate formulation including leverage constraints in the long-short case, as well as turnover constraints, sector, and factor exposure constrains, and others.

Returning to the portfolio optimization problem, let $$R_f^\omega = F^T V^\omega$$

where $R_F^\omega$ is the vector factor component of the asset returns. Thus, $$\max E\, u\, (1+(R_F^\omega+\epsilon)^T x)$$

$$Ax=b, l \leq x \leq h.$$

In accordance with the optimization process, the expected utility is calculated for given values of x as follows $$Eu((1+R_F^\omega+\epsilon)^T x)|_x = \frac{1}{|\Omega|} \sum_{\omega \in \Omega} \int_{-\tau}^{+\tau} u(1+R_F^{\omega T} x + v_x) p(v_x) dv_x$$

where, given the independence of the $\epsilon_i$'s, $$\Gamma_x = \epsilon^T x = N(0, \sigma_x^2)$$

is normal distributed with mean zero and variance $$\sigma_x^2 = \sum_{i=1}^n \sigma_i^2 x_i^2.$$

Therefore, $$Eu((1+R_F^\omega+\epsilon)^T x)|_x = \frac{1}{|\Omega|}\sum_{\omega\in\Omega}\frac{1}{\sqrt{2\pi}}\int_{-\tau}^{+\tau} u(1+R_F^{\omega T}x+\sigma_x v)e^{-\frac{v^2}{2}}dv,$$

Denoting $$\bar{u}_x^\omega = \frac{1}{\sqrt{2\pi}}\int_{-\tau}^{+\tau} u(1+R_F^{\omega T}x+\sigma_x v)e^{-\frac{v^2}{2}}dv.$$

for a given value of x, the calculation of $\bar{u}_x^\omega$ involves the integration of the utility function over a normally distributed random variable with mean value $\mu_x^\omega=1+R_F^{\omega T}x$ and variance $$\sigma_x^2 = \sum_{i=1}^n \sigma_i^2 x_i^2.$$

The integration is only one-dimensional and thus can be carried out numerically using the trapezoidal method. Also, the gradients $$\frac{\partial \bar{u}_x^\omega}{\partial \mu_x^\omega} \text{ and } \frac{\partial \bar{u}_x^\omega}{\partial \sigma_x^2}$$

with respect to $\mu_x^\omega$ and $\sigma_x^2$ can be computed numerically via one-dimensional numerical integration as follows:

$$\frac{\partial \bar{u}_x^\omega}{\partial \mu_x^\omega} = \frac{1}{\sqrt{2\pi}}\int_{-\tau}^{+\tau} u'(\mu_x^\omega+\sigma_x v)e^{-\frac{v^2}{2}}dv$$

$$\frac{\partial \bar{u}_x^\omega}{\partial \sigma_x^2} = \frac{1}{\sqrt{2\pi}}\int_{-\tau}^{+\tau} u'(\mu_x^\omega+\sigma_x v)e^{-\frac{v^2}{2}}\left(\frac{1}{2}v\sigma_x^{-1}\right)dv$$

$$= \frac{1}{2\sqrt{2\pi}\sigma_x}\int_{-\tau}^{+\tau} u'(\mu_x^\omega+\sigma_x v)v e^{-\frac{v^2}{2}}dv.$$

With the partial derivatives obtained numerically, the derivatives with respect to $x_i$ may be computed as $$\frac{\partial \bar{u}_x^\omega}{\partial x_i} = \frac{\partial \bar{u}_x^\omega}{\partial \mu_x^\omega}\frac{\partial \mu_x^\omega}{\partial x_i} + \frac{\partial \bar{u}_x^\omega}{\partial \sigma_x^2}\frac{\partial \sigma_x^2}{\partial x_i}$$

where $$\frac{\partial \mu_x^\omega}{\partial x_i} = R_{Fi}^\omega$$

and $$\frac{\partial \sigma_x^2}{\partial x_i} = 2\sigma_i^2 x_i.$$

The gradients of the objective may now be calculated at given value x with respect to $x_i$ as $$\frac{\partial}{\partial x_i}Eu(1+(R_F^\omega+\epsilon)^T x)\bigg|_x = \frac{1}{|\Omega|}\sum_{\omega\in\Omega}\frac{\partial \bar{u}_x^\omega}{\partial x_i}$$

and the expected utility maximization problem can be solved efficiently using gradient-based nonlinear programming, e.g., using MINOS described in B. A. Murtagh and M. A. Saunders, Minos user's guide, Technical Report SOL 83-20, Department of Operations Research, Stanford University, Stanford Calif. 94305, 1983.

In accordance with another aspect of the present invention, the factor model may be calibrated to a benchmark. Considered in more detail, the factor model for asset returns has been described above as $R=F^T V^\omega+\epsilon$.

The k-vector of factor returns, $V^\omega$, may be represented as $V^\omega=V_0^\omega+V_m$ where $V_m$ is the mean vector of factor returns, and $V_0^\omega$ is the demeaned component of the factor return vector. Using this decomposition of the factor returns allows the vector of asset returns t be expressed as $R=F^T V_m+F^T V_0^\omega+\epsilon$.

The vector of mean factor returns, $V_m$, predicted by the factor model, may be viewed as consisting of two components, an unconditional part ($V_\mu$), as given by the market, and a conditional part ($V_\alpha$)

$V_m=V_\mu+V_\alpha$.

The vector of mean asset returns, $F^T V_m$, predicted by the factor model analogously consists of an unconditional component and a conditional component $F^T V_m=\mu+\alpha$ where $\mu$ is the vector of unconditional mean asset returns, and $\alpha$ is the vector of conditional mean asset returns, conditioned on the values of the factors. For convenience, $z^\omega=F^T V_0^\omega$, may be denoted the demeaned factor explained component of the asset returns.

Combining all components together, the process of asset returns is $R=\alpha+\mu+z^\omega+\epsilon$.

and the unconditional component is $R_u=\mu+z^\omega+\epsilon$.

Using a market equilibrium approach described in F. Black and R. Litterman, Global portfolio optimization, *Financial Analysts Journal*, 48(5):28-43, 1992, for a mean-variance based market equilibrium and R. C. Grinold, Mean-variance and scenario-based approaches to portfolio selection, *Journal of Portfolio Management*, 25(2):10-22, 1999, for scenario-based market equilibrium, the optimal solution of the expected utility maximizing model for unconditional asset return means results in the (cap-weighted) benchmark weights. Thus, using unconditional asset return means, the optimization problem becomes $\max E u (1+u(1+(\mu+z^\omega+\epsilon)^T x)$ $e^T x=1$ where all constraints, except $e^T x=1$, and all bound on holdings $l \leq x \leq h$ have to be such that they allow for the benchmark portfolio as a feasible solution to the problem. Because those constraints and bounds are not binding for the problem based on using unconditional means, they are omitted for the analysis.

On the other hand, given a benchmark portfolio and the unconditional mean and volatility of the benchmark returns, a determination may be made respecting the value of the unconditional asset return mean, such that the expected utility maximization problem results in the benchmark portfolio.

In this regard, the Lagrangian function is $$L(x,\lambda) = E u(1+(\mu+z^\omega+\epsilon)^T x) + \lambda(1-e^T x),$$

and the optimality conditions are $$\frac{\partial L(x,\lambda)}{\partial x_i} = Eu'(1+R_u^T x)R_{u,i} - \lambda = 0, i = 1, \ldots, n,$$

and $$\frac{\partial L(x,\lambda)}{\partial \lambda} = 1 - e^T x = 0,$$

where $R_u = \mu + z^\omega + \epsilon$.

For $x = x_B$ and $u = u_B$ (for the power utility function $\gamma = \gamma_B$), $$E u_B'(1+R_u^T x_B)R_{u,i} - \lambda = 0, i=1,\ldots,n.$$

By multiplying each equation by $x_{Bi}$ and summing over all i $$E u_B'(1+R_u^T x_B)R_{u,B} - \lambda = 0,$$

and with $R_{u,B} = R_u^T x_B$, the unconditional return of the benchmark is $$\lambda = E u_B'(R_{u,B})R_{u,B}.$$

Substituting for $\lambda$, $$E u_B'(1+R_{u,B})R_{u,i} - E u_B'(1+R_{u,B})R_{u,B} = 0, i=1,\ldots,n.$$

Expanding for $R_u$ and with $\mu_B = \mu^T x_B$, $z_B^\omega = z^{\omega T} x_B$ and $\epsilon_B = \epsilon^T x_B$ $$E u_B'(1+R_{uB})(\mu_i+z_i^\omega+\epsilon_i) - E u_B'(1+R_{uB})(\mu_B+z_B^\omega+\epsilon_B) = 0, i=1,\ldots,n.$$

Then, for i=1, ..., n, $$Eu_B'(1+R_{uB})\mu_i + Eu_B'(1+R_{uB})(z_i^\omega + \epsilon_i) - Eu_B'(1+R_{uB})\mu_B - Eu_B'(1+R_{uB})(z_B^\omega + \epsilon_B) = 0$$

and $$\mu_i - \mu_B = -\frac{Eu_B'(1+R_{uB})(z_i^\omega + \epsilon_i - z_B^\omega - \epsilon_B)}{Eu_B'(1+R_{uB})}, i = 1, \ldots, n.$$

The solution becomes $$\mu_i = \mu_B - \frac{Eu_B'(1+\mu_B+z_B^\omega+\epsilon_B)(z_i^\omega + \epsilon_i - z_B^\omega - \epsilon_B)}{Eu_B'(1+\mu_B+z_B^\omega+\epsilon_B)}, i = 1, \ldots, n.$$

Defining a new random variable $\rho$ as $$\rho = -\frac{u_B'(1+\mu_B+z_B^\omega+\epsilon_B)}{Eu_B'(1+\mu_B+z_B^\omega+\epsilon_B)},$$

the above expression can be rewritten as $$\mu_i = \mu_B + \text{cov}(\rho, R_i - R_B)$$

and it is noted that the unconditional mean return for each asset equals the benchmark return plus the covariance between the new variable $\rho$, defined only by quantities of the benchmark, and the difference between the returns of asset i and the benchmark return. See R.C. Grinold, Mean-variance and scenario-based approaches to portfolio selection, *Journal of Portfolio Management*, 25(2):10-22, 1999.

However, actually calculating this covariance is somewhat complicated, because the discrete outcomes $\omega$ as well as the distributions of $\epsilon_i$ and $\epsilon_B$ need to be considered. It is noted that the random variables $\epsilon_i$ and $\epsilon_B$ are correlated in accordance with the definition $\epsilon_B = \epsilon^T x_B$. Accordingly, $\epsilon_B$ may be expressed as the sum of two components $$\epsilon_B = x_{Bi}\epsilon_i + (1-x_{Bi})\epsilon_{B\setminus i}$$

where $$\epsilon_{B\setminus i} \equiv N(0, \sigma_{B\setminus i}^2) \text{ and } \sigma_{B\setminus i}^2 = \sum_{j=1, j\neq i}^n x_{Bj}^2 \sigma_j^2 = \sigma_B^2 - x_{Bi}^2 \sigma_i^2$$

where $$\sigma_B^2 = \sum_{i=1}^n x_{Bi}^2 \sigma_i^2$$

is the idiosyncratic variance of the benchmark. Thus, $$\text{cov}(\epsilon_i, \epsilon_B) = E\epsilon_i \epsilon_B = E\epsilon_i(x_{Bi}\epsilon_i + (1-x_{Bi})\epsilon_{B\setminus i}) = Ex_{Bi}\epsilon_i^2 = x_{Bi}\sigma_i^2,$$

and $$c_{iB} = \text{corr}(\epsilon_i, \epsilon_B) = \frac{x_{Bi}\sigma_i}{\sigma_B}.$$

The expectation may now be computed as $$Eu_B'(1+\mu_B+z_B^\omega+\epsilon_B)(z_i^\omega+\epsilon_i-z_B^\omega-\epsilon_B) = \frac{1}{|\Omega|}\sum_{\omega\in\Omega}\int_{-\tau}^\tau\int_{-\tau}^\tau u_B'(1+\mu_B+z_B^\omega+\sigma_B v)(z_i^\omega-z_B^\omega+\sigma_i w-\sigma_B v)p(v,w)dvdw$$

where p(v, w) is the density function of the unit bivariate normal distribution $$p(v,w) = \frac{1}{2\pi\sqrt{1-c_{iB}^2}}\exp\left(-\frac{1}{2(1-c_{iB}^2)}[v^2+w^2-2c_{iB}vw]\right),$$

and $$Eu_B'(1+\mu_B+z_B^\omega+\epsilon_B) = \frac{1}{|\Omega|}\sum_{\omega\in\Omega}\frac{1}{\sqrt{2\pi}}\int_{-\tau}^\tau u_B'(1+\mu_B+z_B^\omega+\sigma_B v)e^{-\frac{v^2}{2}}dv.$$

For the calibration, $\mu_B$, $z_B^\omega$, and $\sigma_B^2$ need to be initially quantified. With these quantities and the benchmark utility function $\mu_B$ (for the power utility function $\gamma=\gamma_B$) the unconditional means $\mu$ may be calculated. Having obtained $\mu$ from the calibration, $$\alpha = F^T V_m - \mu$$

may be calculated, and the expected utility maximization portfolio optimization model can be written as $$\max Eu\left(1 + \left(\frac{1}{\gamma_A}\alpha + \mu + z^\omega + \epsilon\right)^T x\right)$$

$$Ax = b, l \le x \le h$$

where $\gamma_A$ scales the conditional expected returns according to how much trust the portfolio manager has in them. Conveniently, $\gamma_A$ may be referred to as the active risk aversion. The model will for $u = u_B$ (for the power utility function $\gamma = \gamma_B$) and $\gamma_A \to \infty$ result in the benchmark portfolio. For smaller values of $\gamma_A$, the model will tilt away from the benchmark portfolio to follow the active predictions. Alternatively, the risk aversion $\gamma$, and more generally the utility function, may be selected differently to obtain a suitable portfolio, different from the benchmark portfolio.

In accordance with a further aspect of the present invention, the financial asset portfolio may comprise options. Accordingly, let K and p be the strike price and the price of a call option i, respectively, expressed as a fraction of the price of the corresponding underlying stock. With the return of the underlying stock i given by $r_i = R_{Fi}^\omega + \epsilon_i$, the return of the call option is $$r^{call} = \frac{\max\{0, (1 + R_{Fi}^\omega + \epsilon_i) - K\}}{p} - 1.$$

Similarly, the return of the counterpart put option is $$r^{put} = \frac{\max\{0, K - (1 + R_{Fi}^\omega + \epsilon_i)\}}{p} - 1.$$

Let the subscript k represent a specific type of option, put or call, with (relative) strike price $K_k$ and (relative) price $p_k$ being its parameters. Then we may write the return of option k, $r_k$ as a function of the return of the underlying stock i may be expressed as $$r_k = f_k(R_{Fi}^\omega + \epsilon_i)$$

where $f_k$ may be referred to as the return generating function of the option k.

Considered in more detail, an index option is an option, call or put, where the underlying stock is the entire benchmark. The return of an index option may be expressed as a function of the benchmark return as $$r_k = f_k((R_F^\omega + \epsilon)^T x_B)$$

where $x_B$ is the benchmark portfolio.

Now, let $f(R_F^\omega + \epsilon)^T x_B)$ be the m-column vector of the various index options return generating functions and y be the m-column vector of holdings in the various index options under consideration. The objective of the portfolio optimization problem with index options may be expressed as $$E u (1 + R_F^{\omega T} x + \epsilon^T x + f^T (R_F^{\omega T} x_B + \epsilon^T x_B) y)|_{x,y}$$

where for given value of x $$\Gamma_x = \epsilon^T x = N(0, \sigma_x^2), \sigma_x^2 = \sum_{i=1}^n \sigma_i^2 x_i^2,$$

$$\Gamma_B = \epsilon^T x_B = N(0, \sigma_B^2), \sigma_B^2 = \sum_{i=1}^m \sigma_i^2 x_{Bi}^2,$$

and $\Gamma_x$ and $\Gamma_B$ are correlated with correlation coefficient $c_{xB}$.

In order to calculate the correlation coefficient $c_{xB}$, the covariance of the random variables $\Gamma_x$ and $\Gamma_B$ is calculated as $$\text{cov}(\Gamma_x, \Gamma_B) = E\Gamma_x \Gamma_B = E\sum_{i=1}^n \epsilon_i x_i \Gamma_B.$$

It is useful to express $$\Gamma_B = x_{Bi}\epsilon_i + (1 - x_{Bi})\Gamma_{B\backslash i}$$

where $\Gamma_{B\backslash i} = N(0, \sigma_{B\backslash i}^2)$, $\sigma_{B\backslash i}^2 = \sigma_B^2 - x_{Bi}\sigma_i^2$, and $\Gamma_{B\backslash i}$ is independent of $\epsilon_i$. Thus, $$\text{cov}(\Gamma_x, \Gamma_B) = E\sum_{i=1}^n \epsilon_i x_i (x_{Bi}\epsilon_i + (1 - x_{Bi})\Gamma_{B\backslash i})$$

$$= \sum_{i=1}^n E\epsilon_i^2 x_i x_{Bi} = \sum_{i=1}^n x_i x_{Bi}\sigma_i^2.$$

The correlation coefficient is calculated as $$c_{xB} = \frac{\text{cov}(\Gamma_x, \Gamma_B)}{\sigma_x \sigma_B} = \frac{\sum_{i=1}^n x_i x_{Bi}\sigma_i^2}{\sigma_x \sigma_B} = \frac{\sum_{i=1}^n x_i x_{Bi}\sigma_i^2}{\left(\sqrt{\sum_{i=1}^n \sigma_i^2 x_i^2}\right)\sigma_B}$$

and depends on x.

The objective function may now be expressed as a sum of two-dimensional integrations $$Eu(1 + R_F^{\omega T} x + \epsilon^T x + f^T(R_F^{\omega T} x_B + \epsilon^T x_B)y)|_{x,y} =$$

$$\frac{1}{|\Omega|}\sum_{\omega \in \Omega} \int_{-\tau}^{+\tau} \int_{-\tau}^{+\tau} u(1 + R_F^{\omega T} x + \sigma_x v + f^T(R_F^{\omega T} x_B + \sigma_B w)y) p(v, w) dv dw$$

where p(v, w) is the probability density of the unit bivariate normal distribution $$p(v, w) = \frac{1}{2\pi\sqrt{1 - c_{xB}^2}} \exp\left(-\frac{1}{2(1 - c_{xB}^2)}[v^2 + w^2 - 2c_{xB}vw]\right).$$

Defining $$\bar{u}_{xy}^{\omega} = \int_{-\tau}^{+\tau}\int_{-\tau}^{+\tau} u(1 + R_F^{\omega T}x + \sigma_x v + f^T(R_F^{\omega T}x_B + \sigma_B w)y)p(v, w)\,dv\,dw$$

and $$\mu_x^{\omega} = 1 + R_F^{\omega T}x,$$

the following partial derivatives are obtained via two-dimensional integration:

$$\frac{\partial \bar{u}_{xy}^{\omega}}{\partial \mu_x^{\omega}} = \int_{-\tau}^{+\tau}\int_{-\tau}^{+\tau} u'(1 + R_F^{\omega T}x + \sigma_x v + f^T(R_F^{\omega T}x_B + \sigma_B w)y)p(v,w)\,dv\,dw$$

$$\frac{\partial \bar{u}_{xy}^{\omega}}{\partial \sigma_x^2} = \int_{-\tau}^{+\tau}\int_{-\tau}^{+\tau} u'(1 + R_F^{\omega T}x + \sigma_x v + f^T(R_F^{\omega T}x_B + \sigma_B w)y)$$

$$p(v, w)\left(\frac{1}{2}v\sigma_x^{-1}\right)dv\,dw$$

$$\frac{\partial \bar{u}_{xy}^{\omega}}{\partial c_{xB}} = \int_{-\tau}^{+\tau}\int_{-\tau}^{+\tau} u(1 + R_F^{\omega T}x + \sigma_x v + f^T(R_F^{\omega T}x_B + \sigma_B w)y)$$

$$\left(\frac{\partial p(v, w)}{\partial c_{xB}}\right)dv\,dw$$

where $$\frac{\partial p(v, w)}{\partial c_{xB}} = p(v, w)(1 - c_{xB}^2)^{-1}(vw + c_{xB}(1 + 2\,g))\text{ and where}$$

$$g = -\frac{1}{2}(1 - c_{xB}^2)^{-1}(v^2 + w^2 - 2c_{xB}vw).$$

The partial derivatives with respect to the decision variables $x_i$ are then computed as $$\frac{\partial \bar{u}_{xy}^{\omega}}{\partial x_i} = \frac{\partial \bar{u}_{xy}^{\omega}}{\partial \mu_x^{\omega}}\frac{\partial \mu_x^{\omega}}{\partial x_i} + \frac{\partial \bar{u}_{xy}^{\omega}}{\partial \sigma_x^2}\frac{\partial \sigma_x^2}{\partial x_i} + \frac{\partial \bar{u}_{xy}^{\omega}}{\partial c_{xB}}\frac{\partial c_{xB}}{\partial x_i}$$

where $$\frac{\partial \mu_x^{\omega}}{\partial x_i} = R_{Fi}^{\omega},$$

$$\frac{\partial \sigma_x^2}{\partial x_i} = 2\sigma_i^2 x_i,$$

and $$\frac{\partial c_{xB}}{\partial x_i} = \frac{x_{Bi}\sigma_i^2}{\sigma_x \sigma_B} - c_{xB}\frac{\sigma_i^2 x_i}{\sigma_x^2}.$$

The partial derivatives with respect to the decision variables $y_k$ are computed as $$\frac{\partial \bar{u}_{xy}^{\omega}}{\partial y_k} = \int_{-\tau}^{+\tau}\int_{-\tau}^{+\tau} u'(1 + R_F^{\omega T}x + \sigma_x v + f^T(R_F^{\omega T}x_B + \sigma_B w)y)$$

$$p(v, w)f_k(R_F^{\omega T}x_B + \sigma_B w)dv\,dw.$$

It is noted that the computation involves one two-dimensional integration for each index option k.

Additionally, the analysis of a set of options on a single asset is analogous to the treatment of index options. Instead of $f(R_F^{\omega T}x_B + \epsilon^T x_B)$ in the case of index options, in the case of options on a stock i, $f(R_{Fi}^{\omega} + \epsilon_i)$. Accordingly, the objective of the portfolio optimization problem with options on a stock i is $$E\,u\,(1 + R_F^{\omega T}x + \epsilon^T x + f^T(R_F^{\omega} + \epsilon_i)y)|_{x,y}$$

where for a given value of x $$\Gamma_{x\backslash i} = \epsilon^T x - \epsilon_i x_i = N(0, \sigma_{x\backslash i}^2),\ \sigma_{x\backslash i}^2 = \sum_{j=1, j\neq i}^{n} \sigma_j^2 x_j^2,$$

$$\epsilon_i = N(0, \sigma_i^2),$$

and $\Gamma_{x\backslash i}$ and $\epsilon_i$ are independent by definition.

The objective function may then be expressed as a the sum of two-dimensional integrations $$Eu(1 + R_F^{\omega T}x + \epsilon^T x + f^T(R_{Fi}^{\omega} + \epsilon_i))|_{x,y} =$$

$$\frac{1}{|\Omega|}\sum_{\omega\in\Omega}\int_{-\tau}^{+\tau}\int_{-\tau}^{+\tau} u(1 + R_F^{\omega T}x + \sigma_{x\backslash i}v + \sigma_i x_i w + f^T(R_{Fi}^{\omega} + \sigma_i w)y)$$

$$p(v)p(w)dv\,dw$$

where p(v) and p(w) each are the probability density of the unit normal distribution. Compared to the treatment of index options, the case of a single option on an asset is simpler, due to the independence of $\Gamma_{x\backslash i}$ and $\epsilon_i$. The derivation of the derivatives is analogous to the index option case, but simplifies by setting p(v, w)=p(v) p(w). Consequently, the derivatives are computed as $$\frac{\partial \bar{u}_{xy}^{\omega}}{\partial x_i} = \frac{\partial \bar{u}_{xy}^{\omega}}{\partial \mu_x^{\omega}}R_{Fi}^{\omega} + \frac{\partial \bar{u}_{xy}^{\omega}}{\partial \sigma_i^2}2\sigma_i^2 x_i,$$

where $$\bar{u}_{xy}^{\omega} = \int_{-\tau}^{+\tau}\int_{-\tau}^{+\tau} u(1 + R_F^{\omega T}x + \sigma_{x\backslash i}v + \sigma_i x_i w + f^T(R_{Fi}^{\omega} + \sigma_i w)y)p(v, w)dv\,dw,$$

and, using $\mu_x^{\omega} = 1 + R_F^{\omega T}x$, the partial derivatives $$\frac{\partial \bar{u}_{xy}^{\omega}}{\partial \mu_x^{\omega}} =$$

$$\int_{-\tau}^{+\tau}\int_{-\tau}^{+\tau} u'(1 + R_F^{\omega T}x + \sigma_{x\backslash i}v + \sigma_i x_i w + f^T(R_{Fi}^{\omega} + \sigma_i w)y)p(v, w)dv\,dw,$$

$$\frac{\partial \bar{u}_{xy}^{\omega}}{\partial \sigma_i^2} = \int_{-\tau}^{+\tau}\int_{-\tau}^{+\tau} u'(1 + R_F^{\omega T}x + \sigma_{x\backslash i}v + \sigma_i x_i w + f^T(R_{Fi}^{\omega} + \sigma_i w)y)$$

$$p(v, w)\left(\frac{1}{2}v\sigma_i^{-1}\right)dv\,dw$$

and the partial derivatives with respect to the decision variables $y_k$ are computed as $$\frac{\partial \bar{u}_{xy}^{\omega}}{\partial y_k} = \int_{-\tau}^{+\tau}\int_{-\tau}^{+\tau} u'(1 + R_F^{\omega T}x + \sigma_{x\backslash i}v + \sigma_i x_i w + f^T(R_{Fi}^{\omega} + \sigma_i w)y)$$

$$p(v, w)f_k(R_{Fi}^{\omega} + \sigma_i \omega)dv\,dw,$$

by two-dimensional integration;

Furthermore, the method described above also applies to a portfolio of options (single asset or index), with or without the underlying asset or index as part of the portfolio. In the former case, two-dimensional integrations are required, whereas in the latter case only one-dimensional integrations need to be performed. These cases need not be further described, because the derivations follow directly from the cases discussed above.

Finally, based on the analysis above, it is apparent that options on multiple assets cannot be treated directly in the framework described above, because highdimensional integrations are required. For the case of options on multiple assets (together with index options), solution algorithms based on efficient sampling techniques need to be employed. The process for options on multiple assets will now be described.

Let $$r_k = f_k((R_F^\omega + \epsilon)^T I_k)$$

where $I_k$ is an n-vector representing the underlying asset as a portfolio, such that if i is the underlying asset, component i of $I_k$ equals one, and all other components of $I_k$ equal zero; and if the underlying asset is the benchmark, $I_k = x_B$.

Additionally, let $f(R_F^\omega + \epsilon)^T I)$ be the m-column vector of the various option return generating functions, where $I = (I_1, I_2, \ldots, I_m)$ and, in order to simplify the notation, it is understood that the kth component $f_k$ has $(R_F^\omega + \epsilon)^T I)_k$ as its underlying asset return. Furthermore, let y be the m-column vector of holdings in the various options. The objective of the portfolio optimization problem with options on various corresponding underlying assets may be expressed as $$E u (1 + R_F^{\omega T} x + \epsilon^T x + f^T((R_F^\omega + \epsilon)^T I) y)|_{x,y}.$$

Now, let $\epsilon^v$, $v \in S$ be a sample of realizations of size $|S|$ sampled independently from the distribution of $\epsilon$. Writing the expectation as $$Eu(1 + R_F^{\omega T} x + \epsilon^T x + f^T((R_F^\omega + \epsilon)^T I) y)|_{x,y} = \frac{1}{|\Omega|} \sum_{\omega \in \Omega} \bar{u}_{xy}^\omega,$$

$$\bar{u}_{xy}^\omega = E_\epsilon u(1 + R_F^{\omega T} x + \epsilon^T x + f^T((R_F^\omega + \epsilon)^T I) y)|_{x,y}$$

may be approximated by the sample average $$\hat{u}_{xy}^\omega = \frac{1}{|S|} \sum_{v \in S} u(1 + R_F^{\omega T} x + \epsilon^{vT} x + f^T((R_F^\omega + \epsilon^v)^T I) y)|_{x,y},$$

using a large size of sample $|S| \gg n$. Also the derivatives $$\frac{\partial \bar{u}_{xy}^\omega}{\partial x_i} \text{ and } \frac{\partial \bar{u}_{xy}^\omega}{\partial y_i}$$

may be approximated based on the sample average:

$$\frac{\partial \hat{u}_{xy}^\omega}{\partial x_i} = \frac{1}{|S|} \sum_{v \in S} u'(1 + R_F^{\omega T} x + \epsilon^{vT} x + f^T((R_F^\omega + \epsilon^v)^T I) y)\bigg|_{x,y} (R_{Fi}^\omega + \epsilon_i^v)$$

and $$\frac{\partial \hat{u}_{xy}^\omega}{\partial y_i} = \frac{1}{|S|} \sum_{v \in S} u'(1 + R_F^{\omega T} x + \epsilon^{vT} x +$$

$$f^T((R_F^\omega + \epsilon^v)^T I) y)\bigg|_{x,y} \sum_{k, (I_k)_i \neq 0} f_k(R_F^\omega + \epsilon_i^v) I_k).$$

The computation simplifies, if not all assets are underlying to any option. The components of the error vector that are not underlying to any option can be analytically represented as a single normally distributed random variable, such that if there are $m_o$ assets underlying any option (out of m underlying assets), the sampling needs to be carried out in $m_o + 1$ dimensions. So if there is only one asset underlying various options, the sampling needs to be carried out in two dimensions, which represents an alternative to the method respecting options on a single asset described above.

Because a large sample size is required for an accurate approximation, the application of variance reduction techniques (e.g., importance sampling and control variates) may be employed to improve the estimate. Also, if the error terms of the factor model used are not assumed multivariate normally distributed, the integration cannot be carried out in one or two dimensions, and n-dimensional integrations need to be performed. The sample average method respecting options on multiple assets described above does not require any particular assumptions on the distribution of $\epsilon$ and therefore is directly applicable in the case non-normal error terms.

While the foregoing description has been with reference to particular embodiments of the present invention, it will be appreciated by those skilled in the art that changes to these embodiments may be made without departing from the principles and spirit of the invention. Accordingly, the scope of the present invention can only be ascertained with reference to the appended claims.

What is claimed is:

1. A method using a computer having a processor configured to execute instructions which when executed cause the computer to perform steps to determine a portfolio of financial assets which maximizes the expected utility of wealth to optimize the portfolio, where asset returns are represented by a factor model, the steps comprising:

selecting from multiple financial assets a mix of a plurality of available financial assets comprising the portfolio of financial assets which is to be optimized;

selecting a factor model which represents a distribution of expected asset returns for the plurality of financial assets for a selected subsequent period of time for which the portfolio is to be optimized;

inputting, using the processor, data comprising the factor model including a factor explained part, $R_F^\omega$, and an idiosyncratic part, $\epsilon$, of the expected asset returns and parameters comprising constraints and bounds summarized by $Ax = b, l \le x \le h$ for the portfolio of financial assets into a processor-readable memory, to determine expected utility maximization of the portfolio;

expressing the expected utility maximization as $$\max E u(1 + (R_F^\omega + \epsilon)^T x)$$

$$Ax = b, l \le x \le h;$$

thereby expressing the return of a portfolio x as the sum of a discrete and a continuous random variable, distributed independently, for which the expected utility is to be calculated;

calculating, using the processor, the expected utility of wealth for given values of x based on the selected factor model estimation by integrating over a normally distributed random variable with a mean value $\mu_x^\omega = 1 + R_F^{\omega T} x$ and variance $$\sigma_x^2 = \sum_{i=1}^{n} \sigma_i^2 x_i^2,$$

where time integration is only one-dimensional and is carried out numerically using a trapezoidal method;
- calculating, using the processor, gradients at given value x with respect to $x_i$ where the integrations are only one-dimensional and are carried out numerically using the trapezoidal method;
- determining, using the processor, the expected utility maximization using gradient-based nonlinear programming;
- iteratively changing the mix of financial assets in the portfolio;
- for each altered mix of financial assets in the portfolio, repeating the calculating and determining steps using the processor until an optimum portfolio is found which maximizes the expected utility of period-end wealth; and
- selectively using the optimized portfolio to implement an investment strategy.

2. The method of claim 1 wherein the factor model is selected from the group of factor models consisting of a fundamental factor model, a macro-economic factor model, a statistical factor model and a hybrid factor model.

3. The method of claim 1 wherein the step of calculating the expected utility for given values of x based on the selected factor model estimation is according to $$Eu((1 + R_F^\omega + \epsilon)^T x)\big|_x = \frac{1}{|\Omega|} \sum_{\omega \in \Omega} \int_{-\tau}^{+\tau} u(1 + R_F^{\omega T} x + v_x) p(v_x) dv_x$$

where, given the independence of the $\epsilon_i$'s, $$\Gamma_x = \epsilon^T x = N(0, \sigma_x^2)$$

is normal distributed with mean zero and variance $$\sigma_x^2 = \sum_{i=1}^{n} \sigma_i^2 x_i^2$$

and therefore $$Eu((1 + R_F^\omega + \epsilon)^T x)\big|_x = \frac{1}{|\Omega|} \sum_{\omega \in \Omega} \frac{1}{\sqrt{2\pi}} \int_{-\tau}^{+\tau} u(1 + R_F^{\omega T} x + \sigma_x v) e^{\frac{-v^2}{2}} dv$$

and for given value of x, and calculating $$\frac{1}{\sqrt{2\pi}} \int_{-\tau}^{+\tau} u(1 + R_F^{\omega T} x + \sigma_x v) e^{\frac{-v^2}{2}} dv$$

comprises integration of the utility function over a normally distributed random variable with a mean value $\mu_x^\omega = 1 + R_F^{\omega T} x$ and a variance $$\sigma_x^2 = \sum_{i=1}^{n} \sigma_i^2 x_i^2,$$

where the integration is only one-dimensional and thus can be carried out numerically using the trapezoidal method; and the step of calculating the gradients of the objective at given value x with respect to $x_i$ is according to $$\frac{\partial}{\partial x_i} Eu(1 + (R_F^\omega + \epsilon)^T x)\big|_x = \frac{1}{|\Omega|} \sum_{\omega \in \Omega} \frac{\partial \bar{u}_x^\omega}{\partial x_i}$$

where $$\frac{\partial \bar{u}_x^\omega}{\partial x_i} = \frac{\partial \bar{u}_x^\omega}{\partial \mu_x^\omega} R_{Fi}^\omega + \frac{\partial \bar{u}_x^\omega}{\partial \sigma_x^2} = 2\sigma_i^2 x_i,$$

where the integrations $$\frac{\partial \bar{u}_x^\omega}{\partial \mu_x^\omega} = \frac{1}{\sqrt{2\pi}} \int_{-\tau}^{+\tau} u'(\mu_x^\omega + \sigma_x v) e^{\frac{-v^2}{2}} dv$$

$$\frac{\partial \bar{u}_x^\omega}{\partial \sigma_x^2} = \frac{1}{2\sqrt{2\pi}\,\sigma_x} \int_{-\tau}^{+\tau} u'(\mu_x^\omega + \sigma_x v) v e^{\frac{-v^2}{2}} dv,$$

are only one-dimensional and are carried out numerically using the trapezoidal method.

4. The method of claim 3, further comprising the step of calibrating, using the processor, the expected utility model with a factor model representation of asset returns to a benchmark using a two-dimensional numerical integration by obtaining unconditional expected returns such that the expected utility maximization problem, with only a portfolio constraint, based on a factor model representation of asset returns, results in a benchmark portfolio, where the solution for an unconditional mean return $\mu_i$ is $$\mu_i = \mu_B - \frac{Eu_B'(1 + \mu_B + z_B^\omega + \epsilon_B)(z_i^\omega + \epsilon_i - z_B^\omega - \epsilon_B)}{Eu_B'(1 + \mu_B + z_B^\omega + \epsilon_B)}, i = 1, \ldots, n$$

and expectations $$Eu_B'(1 + \mu_B + z_B^\omega + \epsilon_B)(z_i^\omega + \epsilon_i - z_B^\omega - \epsilon_B) = \frac{1}{|\Omega|}$$

$$\sum_{\omega \in \Omega} \int_{-\tau}^{\tau} \int_{-\tau}^{\tau} u_B'(1 + \mu_B + z_B^\omega + \sigma_B v)(z_i^\omega - z_B^\omega + \sigma_i w - \sigma_B v) p(v, w) dv dw,$$

where p(v, w) is the density function of the unit bivariate normal distribution $$p(v, w) = \frac{1}{2\pi\sqrt{1 - c_{iB}^2}} \exp\left(-\frac{1}{2(1 - c_{iB}^2)}[v^2 + w^2 - 2c_{iB} vw]\right),$$

and

-continued $$Eu'_B(1 + \mu_B + z_B^\omega + \epsilon_B) = \frac{1}{|\Omega|} \sum_{\omega \in \Omega} \frac{1}{\sqrt{2\pi}} \int_{-\tau}^{\tau} u'_B(1 + \mu_B + z_B^\omega + \sigma_B v) e^{\frac{-v^2}{2}} dv$$

are computed; using the processor; using a two-dimensional version of the trapezoidal method.

5. The method of claim 3, further comprising the steps of including options on a benchmark as part of the expected utility maximization problem, where the returns of assets are represented by the factor model, and performing a two-dimensional numerical integration on each iteration of the gradient-based non-linear programming where the objective function $$Eu(1 + R_F^{\omega T}x + \epsilon^T x + f^T(R_F^{\omega T}x_B + \epsilon^T x_B)y)|_{x,y} =$$

$$\frac{1}{|\Omega|} \sum_{\omega \in \Omega} \int_{-\tau}^{+\tau} \int_{-\tau}^{+\tau} u(1 + R_F^{\omega T}x + \sigma_x v + f^T(R_F^{\omega T}x_B + \sigma_B w)y)p(v,w)dvdw,$$

where p(v, w) is the probability density of the unit bivariate normal distribution $$p(v, w) = \frac{1}{2\pi\sqrt{1-c_{xB}^2}} \exp\left(-\frac{1}{2(1-c_{xB}^2)}[v^2 + w^2 - 2c_{xB}vw]\right),$$

and the partial derivatives with respect to the decision variables $x_i$ are computed as $$\frac{\partial \bar{u}_{xy}^\omega}{\partial x_i} = \frac{\partial \bar{u}_{xy}^\omega}{\partial \mu_x^\omega} R_{Fi}^\omega + \frac{\partial \bar{u}_{xy}^\omega}{\partial \sigma_x^2} 2\sigma_i^2 x_i + \frac{\partial \bar{u}_{xy}^\omega}{\partial c_{xB}} \left(\frac{x_{Bi}\sigma_i^2}{\sigma_x \sigma_B} - c_{xB}\frac{\sigma_i^2 x_i}{\sigma_x^2}\right),$$

where $$\bar{u}_{xy}^\omega = \int_{-\tau}^{+\tau} \int_{-\tau}^{+\tau} u(1 + R_F^{\omega T}x + \sigma_x v + f^T(R_F^{\omega T}x_B + \sigma_B w)y)p(v,w)dvdw,$$

and, using $\mu_x^\omega = 1 + R_F^{\omega T}x$, the partial derivatives $$\frac{\partial \bar{u}_{xy}^\omega}{\partial \mu_x^\omega} = \int_{-\tau}^{+\tau} \int_{-\tau}^{+\tau} u'(1 + R_F^{\omega T}x + \sigma_x v + f^T(R_F^{\omega T}x_B + \sigma_B w)y)p(v,w)dvdw$$

$$\frac{\partial \bar{u}_{xy}^\omega}{\partial \sigma_x^2} = \int_{-\tau}^{+\tau} \int_{-\tau}^{+\tau} u'(1 + R_F^{\omega T}x + \sigma_x v + f^T(R_F^{\omega T}x_B + \sigma_B w)y) p(v,w)\left(\frac{1}{2}v\sigma_x^{-1}\right)dvdw$$

$$\frac{\partial \bar{u}_{xy}^\omega}{\partial c_{xB}} = \int_{-\tau}^{+\tau} \int_{-\tau}^{+\tau} u(1 + R_F^{\omega T}x + \sigma_x v + f^T(R_F^{\omega T}x_B + \sigma_B w)y) \left(\frac{\partial p(v,w)}{\partial c_{xB}}\right)dvdw,$$

where $$\left(\frac{\partial p(v,w)}{\partial c_{xB}}\right) = p(v,w)(1-c_{xB}^2)^{-1}(vw + c_{xB}(1+2g)),$$

and where $$g = -\frac{1}{2}(1-c_{xB}^2)^{-1}(v^2 + w^2 - 2c_{xB}vw)$$

and the partial derivatives with respect to the decision variables $y_k$ are computed as $$\frac{\partial \bar{u}_{xy}^\omega}{\partial y_k} = \int_{-\tau}^{+\tau} \int_{-\tau}^{+\tau} u'(1 + R_F^{\omega T}x + \sigma_x v + f^T(R_F^{\omega T}x_B + \sigma_B w)y)$$

$$p(v,w)f_k(R_F^{\omega T}x_B + \sigma_B w)dvdw,$$

using the processor, using a two-dimensional version of the trapezoidal method.

6. The method of claim 3, further comprising the steps of including options on a single asset as part of the expected utility maximization problem, where the returns of assets are represented by the factor model, and performing a two-dimensional numerical integration on each iteration of the gradient-based non-linear programming where by writing the objective function as $$Eu(1 + R_F^{\omega T}x + \epsilon^T x + f^T(R_{Fi}^\omega + \epsilon_i))|_{x,y} =$$

$$\frac{1}{|\Omega|} \sum_{\omega \in \Omega} \int_{-\tau}^{+\tau} \int_{-\tau}^{+\tau} u(1 + R_F^{\omega T}x + \sigma_{xi}v + \sigma_i x_i w + f^T(R_{Fi}^\omega + \sigma_i w)y)$$

$$p(v)p(w)dvdw,$$

where p(v) and p(w) each are the probability density of the unit normal distribution, and the derivatives by setting p(v, w) = p(v)p(w) are computed as the partial derivatives with respect to the decision variables $x_i$ are computed as $$\frac{\partial \bar{u}_{xy}^\omega}{\partial x_i} = \frac{\partial \bar{u}_{xy}^\omega}{\partial \mu_x^\omega} R_{Fi}^\omega + \frac{\partial \bar{u}_{xy}^\omega}{\partial \sigma_i^2} 2\sigma_i^2 x_i,$$

where $$\bar{u}_{xy}^\omega =$$

$$\int_{-\tau}^{+\tau} \int_{-\tau}^{+\tau} u(1 + R_F^{\omega T}x + \sigma_{xi}v + \sigma_i x_i w + f^T(R_{Fi}^\omega + \sigma_i w)y)p(v,w)dvdw,$$

and, using $\mu_x^\omega = 1 + R_F^{\omega T}x$, the partial derivatives $$\frac{\partial \bar{u}_{xy}^\omega}{\partial \mu_x^\omega} =$$

$$\int_{-\tau}^{+\tau} \int_{-\tau}^{+\tau} u'(1 + R_F^{\omega T}x + \sigma_{xi}v + \sigma_i x_i w + f^T(R_{Fi}^\omega + \sigma_i w)y)p(v,w)dvdw$$

$$\frac{\partial \bar{u}_{xy}^\omega}{\partial \sigma_i^2} = \int_{-\tau}^{+\tau} \int_{-\tau}^{+\tau} u'(1 + R_F^{\omega T}x + \sigma_{xi}v + \sigma_i x_i w + f^T(R_{Fi}^\omega + \sigma_i w)y)$$

$$p(v,w)\left(\frac{1}{2}v\sigma_i^{-1}\right)dvdw$$

and the partial derivatives with respect to the decision variables $y_k$ are computed as $$\frac{\partial \bar{u}_{xy}^\omega}{\partial y_k} = \int_{-\tau}^{+\tau} \int_{-\tau}^{+\tau} u'(1 + R_F^{\omega T}x + \sigma_{xi}v + \sigma_i x_i w + f^T(R_{Fi}^\omega + \sigma_i w)y)$$

$$p(v,w)f_k(R_{Fi}^\omega + \sigma_i w)dvdw,$$

using the processor, using a two-dimensional version of the trapezoidal method.

7. The method of claim 3, further comprising the steps of including options on multiple assets as part of the expected utility maximization problem, where the returns of assets are represented by the factor model, and performing integration, using the processor, by a sample average approximation on each iteration of the gradient-based nonlinear programming, by writing the expectation as $$Eu(1+R_F^{\omega T}x+\epsilon^T x+f^T((R_F^\omega+\epsilon)^T I)y)|_{x,y} = \frac{1}{|\Omega|}\sum_{\omega\in\Omega}\bar{u}_{xy}^\omega,$$

and approximating $$\hat{u}_{xy}^\omega = \frac{1}{|S|}\sum_{v\in S}u(1+R_F^{\omega T}x+\epsilon^{vT}x+f^T((R_F^\omega+\epsilon^v)^T I)y)\bigg|_{x,y},$$

by the sample average $$\hat{u}_{xy}^\omega = \frac{1}{|S|}\sum_{v\in S}u(1+R_F^{\omega T}x+\epsilon^{vT}x+f^T((R_F^\omega+\epsilon^v)^T I)y)\bigg|_{x,y},$$

using a large size of sample $|S|\gg n$, and approximating the derivatives $$\frac{\partial \bar{u}_{xy}^\omega}{\partial x_i}$$

and $$\frac{\partial \bar{u}_{xy}^\omega}{\partial y_i}$$

by the sample averages $$\frac{\partial \hat{u}_{xy}^\omega}{\partial x_i} = \frac{1}{|S|}\sum_{v\in S}u'(1+R_F^{\omega T}x+\epsilon^{vT}x+f^T((R_F^\omega+\epsilon^v)^T I)y)\bigg|_{x,y}(R_{Fi}^\omega+\epsilon_i^v)$$

and $$\frac{\partial \hat{u}_{xy}^\omega}{\partial y_i} = \frac{1}{|S|}\sum_{v\in S}u'(1+R_F^{\omega T}x+\epsilon^{vT}x+f^T((R_F^\omega+\epsilon^v)^T I)y)\bigg|_{x,y}\left(\sum_{k,(I_k)i\neq 0}f_k(R_F^\omega+\epsilon_i^v)I_k\right).$$

8. A system having instructions stored on or in a non-transitory computer-readable storage medium for execution by a processor to determine a portfolio of financial assets which maximizes the expected utility of wealth to optimize the portfolio, where asset returns are represented by a factor model, the system having instructions comprising:

instructions for selecting from multiple financial assets a mix of a plurality of available financial assets comprising the portfolio of financial assets which is to be optimized;

instructions for selecting a factor model which represents a distribution of expected asset returns for the plurality of financial assets for a selected subsequent period of time for which the portfolio is to be optimized;

instructions for inputting data comprising the factor model including a factor explained part, $R_F^\omega$, and an idiosyncratic part, $\epsilon$, of the expected asset returns and parameters comprising constraints and bounds summarized by $Ax=b, l\leq x\leq h$ for the portfolio of financial assets to determine expected utility maximization of the portfolio into a processor-readable memory;

instructions for expressing the expected utility maximization as $$\max E\, u(1+(R_F^\omega+\epsilon)^T x)$$

$$Ax=b, l\leq x\leq h;$$

thereby expressing the return of a portfolio x as the sum of a discrete and a continuous random variable, distributed independently, for which the expected utility is to be calculated;

instructions for calculating the expected utility of wealth for given values of x based on the selected factor model estimation by integrating over a normally distributed random variable with a mean value $\mu_x^\omega = 1+R_F^{\omega T}x$ and variance $$\sigma_x^2 = \sum_{i=1}^n \sigma_i^2 x_x^2,$$

where the integration is only one-dimensional and is carried out numerically using a trapezoidal method;

instructions for calculating gradients at given value x with respect to $x_i$ where the integrations are only one-dimensional and are carried out numerically using the trapezoidal method;

instructions for determining the expected utility maximization using gradient-based nonlinear programming;

instructions for iteratively changing the mix of financial assets in the portfolio;

instructions for repeating the calculating and determining instructions for each altered mix of financial assets in the portfolio until an optimum portfolio is found which maximizes the expected utility of period-end wealth; and instructions for presenting the optimized portfolio for use in implementing an investment strategy.

9. The system of claim 8 wherein the factor model is selected from the group of factor models consisting of a fundamental factor model, a macro-economic factor model, a statistical factor model and a hybrid factor model.

10. The method of claim 8 wherein calculating the expected utility for given values of x based on the selected factor model estimation is according to $$Eu((1+R_F^\omega+\epsilon)^T x)|_x = \frac{1}{|\Omega|}\sum_{\omega\in\Omega}\int_{-\tau}^{+\tau}u(1+R_F^{\omega T}x+v_x)p(v_x)dv_x$$

where, given the independence of the $\epsilon_i$'s, $$\Gamma_x = \epsilon^T x = N(0,\sigma_x^2)$$

is normal distributed with mean zero and variance $$\sigma_x^2 = \sum_{i=1}^n \sigma_i^2 x_i^2$$

and therefore $$Eu((1+R_F^\omega+\epsilon)^T x)|_x = \frac{1}{|\Omega|} \sum_{\omega \in \Omega} \frac{1}{\sqrt{2\pi}} \int_{-\tau}^{+\tau} u(1+R_F^{\omega T} x + \sigma_x v) e^{\frac{-v^2}{2}} dv$$

and for given value of x, and calculating $$\frac{1}{\sqrt{2\pi}} \int_{-\tau}^{+\tau} u(1+R_F^{\omega T} x + \sigma_x v) e^{\frac{-v^2}{2}} dv$$

comprises integration of the utility function over a normally distributed random variable with a mean value $\mu_x^\omega = 1 + R_F^{\omega T} x$ and a variance $$\sigma_x^2 = \sum_{i=1}^n \sigma_i^2 x_x^2,$$

where the integration is only one-dimensional and thus can be carried out numerically using the trapezoidal method; and calculating the gradients of the objective at given value x with respect to $x_i$ is according to $$\frac{\partial}{\partial x_i} Eu(1+(R_F^\omega + \epsilon)^T x)\Big|_x = \frac{1}{|\Omega|} \sum_{\omega \in \Omega} \frac{\partial \hat{u}_x^\omega}{\partial x_i}$$

where $$\frac{\partial \bar{u}_x^\omega}{\partial x_i} = \frac{\partial \bar{u}_x^\omega}{\partial \mu_x^\omega} R_{Fi}^\omega + \frac{\partial \bar{u}_x^\omega}{\partial \sigma_x^2} 2\sigma_i^2 x_i,$$

where the integrations $$\frac{\partial \bar{u}_x^\omega}{\partial \mu_x^\omega} = \frac{1}{\sqrt{2\pi}} \int_{-\tau}^{+\tau} u'(\mu_x^\omega + \sigma_x v) e^{\frac{-v^2}{2}} dv$$

$$\frac{\partial \bar{u}_x^\omega}{\partial \sigma_x^2} = \frac{1}{\sqrt{2\pi}\,\sigma_x} \int_{-\tau}^{+\tau} u'(\mu_x^\omega + \sigma_x v) v e^{\frac{-v^2}{2}} dv,$$

are only one-dimensional and are carried out numerically using the trapezoidal method.

11. The system of claim 10, further comprising instructions for calibrating the expected utility model with a factor model representation of asset returns to a benchmark using a two-dimensional numerical integration by obtaining unconditional expected returns such that the expected utility maximization problem, with only a portfolio constraint, based on a factor model representation of asset returns, results in a benchmark portfolio, where the solution for an unconditional mean return $\mu_i$ is $$\mu_i = \mu_B - \frac{Eu_B'(1+\mu_B + z_B^\omega + \epsilon_B)(z_i^\omega + \epsilon_i - z_B^\omega - \epsilon_B)}{Eu_B'(1+\mu_B + z_B^\omega + \epsilon_B)},$$

$$i = 1, \ldots, n$$

and expectations $$Eu_B'(1+\mu_B + z_B^\omega + \epsilon_B)(z_i^\omega + \epsilon_i - z_B^\omega - \epsilon_B) =$$

$$\frac{1}{|\Omega|} \sum_{\omega \in \Omega} \int_{-\tau}^{\tau} \int_{-\tau}^{\tau} u_B'(1+\mu_B + z_B^\omega + \sigma_B v)$$

$$(z_i^\omega - z_B^\omega + \sigma_i w - \sigma_B v) p(v,w) dv\, dw,$$

where p(v, w) is the density function of the unit bivariate normal distribution $$p(v,w) = \frac{1}{2\pi\sqrt{1-c_{iB}^2}} \exp\left(-\frac{1}{2(1-c_{iB}^2)}[v^2 + w^2 - 2c_{iB}vw]\right),$$

and $$Eu_B'(1+\mu_B + z_B^\omega + \epsilon_B) = \frac{1}{|\Omega|} \sum_{\omega \in \Omega} \frac{1}{\sqrt{2\pi}} \int_{-\tau}^{\tau} u_B'(1+\mu_B + z_B^\omega + \sigma_B v) e^{\frac{-v^2}{2}} dv$$

are computed using a two-dimensional version of the trapezoidal method.

12. The system of claim 10 wherein options on a benchmark are included as part of the expected utility maximization problem, where the returns of assets are represented by the factor model, and further comprising instructions for performing a two-dimensional numerical integration on each iteration of the gradient-based nonlinear programming where the objective function $$Eu(1 + R_F^{\omega T} x + \epsilon^T x + f^T(R_F^{\omega T} x_B + \epsilon^T x_B)y)|_{x,y} =$$

$$\frac{1}{|\Omega|} \sum_{\omega \in \Omega} \int_{-\tau}^{+\tau} \int_{-\tau}^{+\tau} u(1+R_F^{\omega T} x + \sigma_x v + f^T(R_F^{\omega T} x_B + \sigma_B w)y) p(v,w) dv\, dw,$$

where p(v, w) is the probability density of the unit bivariate normal distribution $$p(v,w) = \frac{1}{2\pi\sqrt{1-c_{xB}^2}} \exp\left(-\frac{1}{2(1-c_{xB}^2)}[v^2 + w^2 - 2c_{xB}vw]\right),$$

and the partial derivatives with respect to the decision variables $x_i$ are computed as $$\frac{\partial \bar{u}_{xy}^\omega}{\partial x_i} = \frac{\partial \bar{u}_{xy}^\omega}{\partial \mu_x^\omega} R_{Fi}^\omega + \frac{\partial \bar{u}_{xy}^\omega}{\partial \sigma_x^2} 2\sigma_i^2 x_i + \frac{\partial \bar{u}_{xy}^\omega}{\partial c_{xB}} \left(\frac{x_{Bi}\sigma_i^2}{\sigma_x \sigma_B} - c_{xB} \frac{\sigma_i^2 x_i}{\sigma_x^2}\right),$$

where $$\bar{u}_{xy}^\omega = \int_{-\tau}^{+\tau} \int_{-\tau}^{+\tau} u(1+R_F^{\omega T} x + \sigma_x v + f^T(R_F^{\omega T} x_B + \sigma_B w)y) p(v,w) dv\, dw,$$

and, using $\mu_x^\omega = 1 + R_F^{\omega T} x$, the partial derivatives $$\frac{\partial \bar{u}_{xy}^\omega}{\partial \mu_x^\omega} = \int_{-\tau}^{+\tau} \int_{-\tau}^{+\tau} u'(1 + R_F^{\omega T} x + \sigma_x v + f^T(R_F^{\omega T} x_B + \sigma_B w) y) p(v, w) dv dw$$

$$\frac{\partial \bar{u}_{xy}^\omega}{\partial \sigma_x^2} = \int_{-\tau}^{+\tau} \int_{-\tau}^{+\tau} u'(1 + R_F^{\omega T} x + \sigma_x v + f^T(R_F^{\omega T} x_B + \sigma_B w) y)$$

$$p(v, w)\left(\frac{1}{2} v \sigma_x^{-1}\right) dv dw$$

$$\frac{\partial \bar{u}_{xy}^\omega}{\partial c_{xB}} = \int_{-\tau}^{+\tau} \int_{-\tau}^{+\tau} u(1 + R_F^{\omega T} x + \sigma_x v + f^T(R_F^{\omega T} x_B + \sigma_B w) y)$$

$$\left(\frac{\partial p(v, w)}{\partial c_{xB}}\right) dv dw,$$

where $$\frac{\partial p(v, w)}{\partial c_{xB}} = p(v, w)(1 - c_{xB}^2)^{-1}(vw + c_{xB}(1 + 2g)),$$

and where $$g = -\frac{1}{2}(1 - c_{xB}^2)^{-1}(v^2 + w^2 - 2c_{xB} v w)$$

and the partial derivatives with respect to the decision variables $y_k$ are computed as $$\frac{\partial \bar{u}_{xy}^\omega}{\partial y_k} = \int_{-\tau}^{+\tau} \int_{-\tau}^{+\tau} u'(1 + R_F^{\omega T} x + \sigma_x v + f^T(R_F^{\omega T} x_B + \sigma_B w) y)$$

$$p(v, w) f_k(R_F^{\omega T} x_B + \sigma_B w) dv dw,$$

using a two-dimensional version of the trapezoidal method.

13. The system of claim 10 wherein options on a single asset are included as part of the expected utility maximization problem, where the returns of assets are represented by the factor model, and further comprising instructions for performing a two-dimensional numerical integration on each iteration of the gradient-based nonlinear programming where by writing the objective function as $$Eu(1 + R_F^{\omega T} x + \epsilon^T x + f^T(R_{Fi}^{\omega T} + \epsilon_i))|_{x,y} =$$

$$\frac{1}{|\Omega|} \sum_{\omega \in \Omega} \int_{-\tau}^{+\tau} \int_{-\tau}^{+\tau} u(1 + R_F^{\omega T} x + \sigma_{xi} v + \sigma_i x_i w + f^T(R_{Fi}^\omega + \sigma_i w) y)$$

$$p(v) p(w) dv dw,$$

where $p(v)$ and $p(w)$ each are the probability density of the unit normal distribution, and the derivatives by setting $p(v, w) = p(v) p(w)$ are computed as the partial derivatives with respect to the decision variables $x_i$ are computed as $$\frac{\partial \bar{u}_{xy}^\omega}{\partial x_i} = \frac{\partial \bar{u}_{xy}^\omega}{\partial \mu_x^\omega} R_{Fi}^\omega + \frac{\partial \bar{u}_{xy}^\omega}{\partial \sigma_i^2} 2 \sigma_i^2 x_i,$$

where $$\bar{u}_{xy}^\omega =$$

$$\int_{-\tau}^{+\tau} \int_{-\tau}^{+\tau} u(1 + R_F^{\omega T} x + \sigma_{xi} v + \sigma_i x_i w + f^T(R_{Fi}^\omega + \sigma_i w) y) p(v, w) dv dw,$$

and, using $\mu_x^\omega = 1 + R_F^{\omega T} \chi$, the partial derivatives $$\frac{\partial \bar{u}_{xy}^\omega}{\partial \mu_x^\omega} =$$

$$\int_{-\tau}^{+\tau} \int_{-\tau}^{+\tau} u'(1 + R_F^{\omega T} x + \sigma_{xi} v + \sigma_i x_i w + f^T(R_{Fi}^\omega + \sigma_i w) y) p(v, w) dv dw$$

$$\frac{\partial \bar{u}_{xy}^\omega}{\partial \sigma_i^2} = \int_{-\tau}^{+\tau} \int_{-\tau}^{+\tau} u'(1 + R_F^{\omega T} x + \sigma_{xi} v + \sigma_i x_i w + f^T(R_{Fi}^\omega + \sigma_i w) y)$$

$$p(v, w)\left(\frac{1}{2} v \sigma_i^{-1}\right) dv dw$$

and the partial derivatives with respect to the decision variables $y_k$ are computed as $$\frac{\partial \bar{u}_{xy}^\omega}{\partial y_k} = \int_{-\tau}^{+\tau} \int_{-\tau}^{+\tau} u'(1 + R_F^{\omega T} x + \sigma_{xi} v + \sigma_i x_i w + f^T(R_{Fi}^\omega + \sigma_i w) y)$$

$$p(v, w) f_k(R_{Fi}^\omega + \sigma_i w) dv dw,$$

using a two-dimensional version of the trapezoidal method.

14. The system of claim 10 wherein options on multiple assets are included as part of the expected utility maximization problem, where the returns of assets are represented by the factor model, and further comprising instructions for performing integration by a sample average approximation on each iteration of the gradient-based nonlinear programming, by writing the expectation as $$Eu(1 + R_F^{\omega T} x + \epsilon^T x + f^T((R_F^\omega + \epsilon)^T I) y)|_{x,y} = \frac{1}{|\Omega|} \sum_{\omega \in \Omega} \bar{u}_{xy}^\omega,$$

and approximating $$\bar{u}_{xy}^\omega = E_\epsilon u(1 + R_F^{\omega T} x + \epsilon^T x + f^T((R_F^\omega + \epsilon)^T I) y)|_{x,y},$$

by the sample average $$\hat{u}_{xy}^\omega = \frac{1}{|S|} \sum_{v \in S} u(1 + R_F^{\omega T} x + \epsilon^{vT} x + f^T((R_F^\omega + \epsilon^v)^T I) y)\bigg|_{x,y},$$

using a large size of sample $|S| \gg n$, and approximating the derivatives $$\frac{\partial \bar{u}_{xy}^\omega}{\partial x_i}$$

and $$\frac{\partial \bar{u}_{xy}^\omega}{\partial y_i}$$

by the sample averages $$\frac{\partial \hat{u}_{xy}^\omega}{\partial x_i} = \frac{1}{|S|} \sum_{v \in S} u'(1 + R_F^{\omega T} x + \epsilon^{vT} x + f^T((R_F^\omega + \epsilon^v)^T I) y)\bigg|_{x,y} (R_{Fi}^\omega + \epsilon_i^v)$$

and $$\frac{\partial \hat{u}_{xy}^\omega}{\partial y_i} = \frac{1}{|S|} \sum_{v \in S} u'(1 + R_F^{\omega T} x + \epsilon^{vT} x + f^T((R_F^\omega + \epsilon^v)^T I) y)\bigg|_{\sum_{k, l_k, l_k \neq 0} f_k(R_F^\omega + \epsilon_i^v) I_k}.$$

* * * * *

UNITED STATES PATENT AND TRADEMARK OFFICE
CERTIFICATE OF CORRECTION

PATENT NO.         : 8,548,890 B2
APPLICATION NO.    : 12/927175
DATED              : October 1, 2013
INVENTOR(S)        : Gerd Infanger It is certified that error appears in the above-identified patent and that said Letters Patent is hereby corrected as shown below:

In the Drawings:

In Figure 3, in the first block, delete "CALCULATING AN EXPECTED UTILITY,"

In the Specifications:

In column 1, line 45 delete " $Ax=b, l \leq x \leq h$ ", insert -- $Ax = b, \ l \leq x \leq h$ --

In column 3, line 53 delete "n>|ω|", insert -- n > |Ω| --

In column 4, line 11 delete "$R^v \in S$", insert -- $R^v \in S$ --

In column 9, line 51 delete " $s \backslash t \ \delta^\omega = R^\omega F^{\omega T} V^\omega$ ", insert -- $s/t \ \ \delta^\omega = R^\omega F^{\omega T} V^\omega$ --

In column 10, line 5 delete " $\sum^\omega$, is $\sum^\omega = \sigma^{\omega 2} W^{-1}$, ", insert -- $\Sigma^\omega$, is $\Sigma^\omega = \sigma^{\omega 2} W^{-1}$, --

In column 10, line 26 delete " $\hat{\sigma}^c a + b\hat{\sigma}^{c-1} + \hat{\sigma}_v$ ", insert -- $\hat{\sigma}^c = a + b\hat{\sigma}^{c-1} + \hat{\sigma}_\nu$ --

In column 11, line 50 delete "an example", insert -- a --

In column 11, line 55 delete " $Ax=b, l \leq x \leq h.$ ", insert -- $Ax = b, \ l \leq x \leq h.$ --

In column 12, line 42 delete " $R_f^\omega = F^T V^\omega$ ", insert -- $R_F^\omega = F^T V^\omega$ --

In column 12, line 43 delete "$R_F^\omega$", insert -- $R_F^\omega$ --

In column 12, line 46 delete " $\max E \ u \ (1+(R_F^\omega + \epsilon)^T x)$ ", insert -- $\max E \ u(1 + (R_F^\omega + \epsilon)^T x)$ --

In column 12, line 48 delete " $Ax=b, l \leq x \leq h.$ ", insert -- $Ax = b, \ l \leq x \leq h.$ --

In column 14, line 66 delete "l≤x≤h", insert -- $l \leq x \leq h$ --

Signed and Sealed this
Twenty-ninth Day of April, 2014

Michelle K. Lee
*Deputy Director of the United States Patent and Trademark Office*

CERTIFICATE OF CORRECTION (continued)
U.S. Pat. No. 8,548,890 B2

In column 15, line 25 delete "$E\ u_B'(1+R_u^T x_B)R_{u,i}-\lambda=0,\ i=1,\ldots,n.$", insert -- $E\ u_B'(1 + R_u^T x_B)R_{u,i} - \lambda = 0, \quad i = 1, \ldots, n.$ --

In column 15, line 28 delete "$E\ u_B'(1+R_u^T x_B)R_{u,B}-\lambda=0,$", insert -- $E\ u_B'(1 + R_u^T x_B)R_{u,B} - \lambda = 0,$ --

In column 15, line 32 delete "$\lambda = E\ u_B'(R_{u,B})R_{u,B}.$", insert -- $\lambda = E\ u_B'(R_{u,B})R_{u,B}.$ --

In column 15, line 35 delete "$E\ u_B'(1+R_{u,B})R_{u,i}-E\ u_B'(1+R_{u,B})R_{u,B}=0,\ i=1,\ldots,n.$", insert -- $E\ u_B'(1 + R_{u,B})R_{u,i} - E\ u_B'(1 + R_{u,B})R_{u,B} = 0, \quad i = 1, \ldots, n.$ --

In column 15, lines 39-40 delete "$E\ u_B'(1+R_{uB})(\mu_i+z_i^\omega+\epsilon_i)-E\ u_B'(1+R_{uB})(\mu_B+z_B^\omega+\epsilon_B)=0,\ i=1,\ldots,n.$", insert -- $E\ u_B'(1 + R_{uB})(\mu_i + z_i^\omega + \epsilon_i) - E\ u_B'(1 + R_{uB})(\mu_B + z_B^\omega + \epsilon_B) = 0, \quad i = 1, \ldots, n.$ --

In column 16, line 63 delete "$\mu_B$", insert -- $u_B$ --

In column 19, line 64 delete "$f(R_F^\omega + \epsilon_i)$", insert -- $f(R_{Fi}^\omega + \epsilon_i)$ --

In column 19, line 67 delete "$E\ u(1+R_F^{\omega T}x+\epsilon^T x+f^T(R_F^\omega+\epsilon_i)y)|_{x,y}$", insert -- $E\ u(1 + R_F^{\omega T}x + \epsilon^T x + f^T(R_{Fi}^\omega + \epsilon_i)y)|_{x,y}$ --

In column 20, line 38, delete "$\mu_x^\omega = 1 + R_F^{\omega T}x$", insert -- $\mu_x^\omega = 1 + R_F^{\omega T}x$ --

In the Claims:

In column 22, line 61 delete "$Ax=b, l\le x\le h$", insert -- $Ax = b,\ l \le x \le h$ --

In column 32, line 61, delete "$\frac{\partial \hat{u}_{xy}^\omega}{\partial y_i} = \frac{1}{|S|}\sum_{\nu\in S} u'(1 + R_F^{\omega T}x + \epsilon^{\nu T}x + f^T((R_F^\omega+\epsilon^\nu)^T I)y)\bigg|\sum_{k,(I_k)_i\ne 0} f_k(R_F^\omega + \epsilon_i^\nu)I_k).$", insert -- $\frac{\partial \hat{u}_{xy}^\omega}{\partial y_i} = \frac{1}{|S|}\sum_{\nu\in S} u'(1 + R_F^{\omega T}x + \epsilon^{\nu T}x + f^T((R_F^\omega+\epsilon^\nu)^T I)y)|_{x,y} \sum_{k,(I_k)_i\ne 0} f_k(R_F^\omega + \epsilon_i^\nu)I_k).$ --